United States Patent
Yanai et al.

(10) Patent No.: US 7,470,456 B2
(45) Date of Patent: Dec. 30, 2008

(54) LIQUID CRYSTAL COMPOSITION AND LIQUID CRYSTAL DISPLAY DEVICE

(75) Inventors: Motoki Yanai, Chiba (JP); Takashi Hiraoka, Chiba (JP); Shuichi Goto, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 40 days.

(21) Appl. No.: 11/806,356

(22) Filed: May 31, 2007

(65) Prior Publication Data

US 2007/0278450 A1    Dec. 6, 2007

(30) Foreign Application Priority Data

May 31, 2006    (JP)    ............... 2006-151077

(51) Int. Cl.
C09K 19/30    (2006.01)
C09K 19/12    (2006.01)

(52) U.S. Cl. .............. 428/1.1; 252/299.63; 252/299.66; 428/1.3

(58) Field of Classification Search ............... 428/1.1, 428/1.3; 252/299.63, 299.66
See application file for complete search history.

(56) References Cited

U.S. PATENT DOCUMENTS

| | | | |
|---|---|---|---|
| 6,315,922 B1 * | 11/2001 | Takeshita et al. ....... | 252/299.61 |
| 7,105,210 B2 * | 9/2006 | Heckmeier et al. ............ | 428/1.1 |
| 2004/0173776 A1 | 9/2004 | Heckmeier et al. | |
| 2006/0204674 A1 | 9/2006 | Heckmeier et al. | |
| 2007/0001149 A1 | 1/2007 | Manabe et al. | |

FOREIGN PATENT DOCUMENTS

| | | |
|---|---|---|
| DE | 10 2005 027762 A1 | 1/2006 |
| EP | 0 062 470 A1 | 10/1982 |
| EP | 0 132 377 A2 | 1/1985 |
| EP | 1 046 694 A1 | 10/2000 |
| EP | 1 454 975 A2 | 9/2004 |
| JP | 2001-003053 A2 | 1/2001 |
| JP | 2004-285353 A2 | 10/2004 |
| WO | WO 03 033619 A | 4/2003 |
| WO | WO 2007/007775 A1 | 1/2005 |
| WO | WO 2005/017067 A1 | 2/2005 |

OTHER PUBLICATIONS

European Search Report, Application No. EP 07 25 1925, dated Sep. 14, 2007.

* cited by examiner

*Primary Examiner*—Shean C Wu
(74) *Attorney, Agent, or Firm*—Hogan & Hartson LLP

(57) ABSTRACT

A liquid crystal composition having a nematic phase that includes three components, wherein the first component is at least one compound selected from the group of compounds represented by Formula (1), the second component is at least one compound selected from the group of compounds represented by Formulas (2-1) to (2-3), and the third component is at least one compound selected from the group of compounds represented by Formula (3):

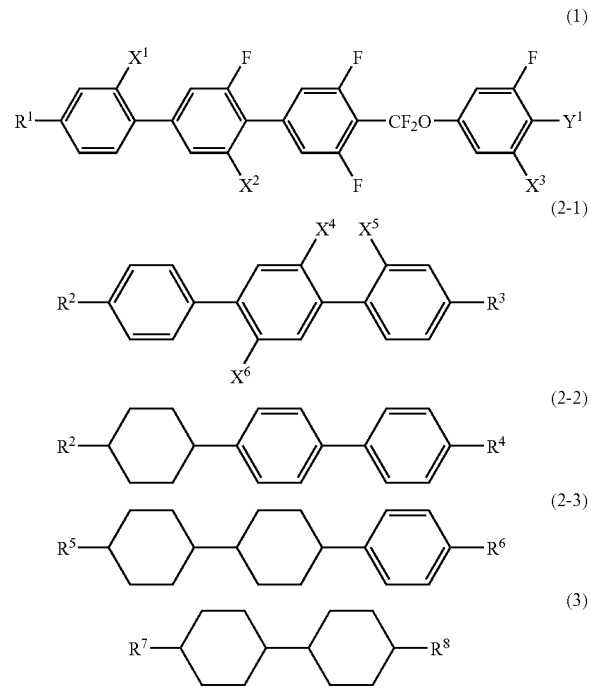

wherein, for example, $R^1$, $R^2$, $R^3$, $R^4$, $R^5$, $R^6$, $R^7$ and $R^8$ are alkyl having 1 to 12 carbons; $Y^1$ is fluorine, $-OCF_3$ or $-OCHF_2$; and $X^1$, $X^2$, $X^3$, $X^4$, $X^5$ and $X^6$ are each independently hydrogen or fluorine, provided that at least one of $X^4$, $X^5$ and $X^6$ is fluorine.

16 Claims, No Drawings

LIQUID CRYSTAL COMPOSITION AND LIQUID CRYSTAL DISPLAY DEVICE

CROSS REFERENCE TO RELATED APPLICATIONS

This application claims priority under 35 U.S.C. § 119 to Japanese Patent Application No. JP 2006-151077, filed May 31, 2006, which is expressly incorporated herein by reference in its entirety.

BACKGROUND OF THE INVENTION

1. Field of the Invention

The invention relates to a liquid crystal composition suitable for use in an active matrix (AM) device and an AM device containing the composition. The composition has a nematic phase and a positive dielectric anisotropy.

2. Related Art

In a liquid crystal display device, classification based on an operating mode of liquid crystals includes phase change (PC), twisted nematic (TN), super twisted nematic (STN), electrically controlled birefringence (ECB), optically compensated bend (OCB), in-plane switching (IPS), vertical alignment (VA), and so forth. Classification based on a driving mode includes a passive matrix (PM) and an active matrix (AM). PM is further classified into static, multiplex and so forth, and AM is classified into a thin film transistor (TFT), a metal insulator metal (MIM) and so forth. TFT is further classified into amorphous silicon and polycrystal silicon. The latter is classified into a high temperature type and a low temperature type according to a production process. Classification based on a light source includes a reflection type utilizing a natural light, a transmission type utilizing a backlight and a semi-transmission type utilizing both the natural light and the backlight.

These devices contain a liquid crystal composition having suitable characteristics. The liquid crystal composition has a nematic phase. General characteristics of the composition should be improved to obtain an AM device having good general characteristics. Table 1 below summarizes a relationship between the general characteristics of the two. The general characteristics of the composition will be explained further based on a commercially available AM device. A temperature range of a nematic phase relates to the temperature range in which the device can be used. A desirable maximum temperature of the nematic phase is approximately 70° C. or more and a desirable minimum temperature is approximately −10° C. or less. The viscosity of the composition relates to the response time of the device. A short response time is desirable for displaying a moving image. Accordingly, a small viscosity of the composition is desirable. A small viscosity at a low temperature is more desirable.

TABLE 1

General Characteristics of a Liquid Crystal Composition and an AM Device

| No | General Characteristics of a Composition | General Characteristics of an AM Device |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Dielectric anisotropy is large | Threshold voltage is low, electric power consumption is small, and a contrast ratio is large |
| 5 | Specific resistance is large | Voltage holding ratio is large and a contrast ratio is large |
| 6 | It is stable to ultraviolet light and heat | Service life is long |

Notes:
[1]A liquid crystal composition can be injected into a cell in a short time.

The optical anisotropy of the composition relates to the contrast ratio of the device. A product (Δn·d) of the optical anisotropy (Δn) of the composition and the cell gap (d) of the device is designed to maximize the contrast ratio. A suitable value of the product depends on the kind of operation mode. In a device having a TN mode and so forth, a suitable value is approximately 0.45 μm. In this case, a composition having a large optical anisotropy is desirable for a device having a small cell gap. A large dielectric anisotropy of the composition contributes to a low threshold voltage, a small electric power consumption and a large contrast ratio. In general, a larger dielectric anisotropy provides a larger viscosity. A suitable dielectric anisotropy is demanded depending on the purpose of the device. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. A stability of the composition to an ultraviolet light and heat relates to a service life of the liquid crystal display device. In the case where the stability is high, the device has a long service life.

Conventional compositions are disclosed in the following patent documents: JP 2001-3053 A/2001 (EP 1046694 A1), WO 2005017067 A1, JP 2004-285353 A2/2004 (EP 1454975 A2) and WO 2005007775 A1.

A desirable AM device is characterized as having a usable temperature range that is wide, a response time that is short, a contrast ratio that is large, a threshold voltage that is low, a voltage holding ratio that is large, a service life that is long, and so forth. Even a one millisecond shorter response time is desirable. Thus, a composition having characteristics such as a high maximum temperature of a nematic phase, a low minimum temperature of a nematic phase, a small viscosity, a large optical anisotropy, a large dielectric anisotropy, a large specific resistance, a high stability to an ultraviolet light, a high stability to heat, and so forth is especially desirable.

SUMMARY OF THE INVENTION

The invention concerns a liquid crystal composition having a nematic phase including three components, wherein the first component is at least one compound selected from the group of compounds represented by Formula (1), the second component is at least one compound selected from the group of compounds represented by Formulas (2-1) to (2-3), and the third component is at least one compound selected from the group of compounds represented by Formula (3):

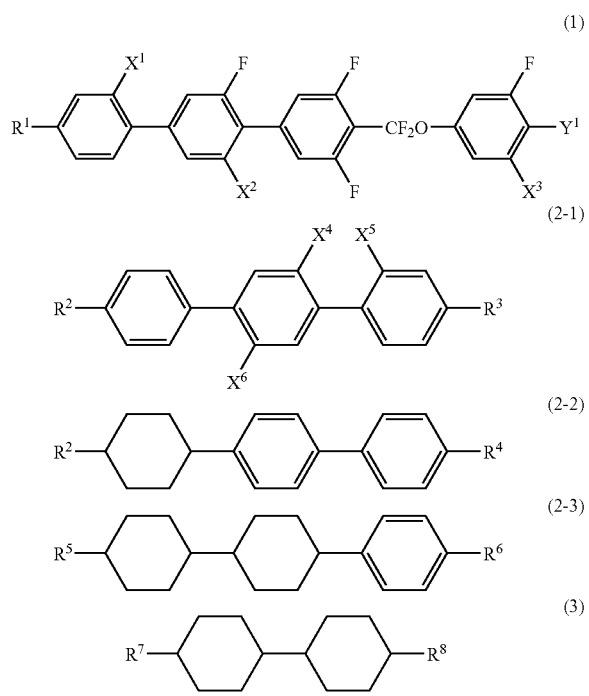

(1)

(2-1)

(2-2)

(2-3)

(3)

wherein R¹ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which is replaced by fluorine; $R^2$, $R^3$ and $R^5$ are each independently alkyl having 1 to 12 carbons, alkenyl having 2 to 12 carbons or alkenyl having 2 to 12 carbons, arbitrary hydrogen of which is replaced by fluorine; $R^4$ is fluorine, alkyl having 1 to 12 carbons or alkenyl having 2 to 12 carbons; $R^6$ is fluorine, chlorine, alkyl having 1 to 12 carbons, alkoxy having 1 to 12 carbons or alkenyl having 2 to 12 carbons; $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which is replaced by fluorine; $Y^1$ is fluorine, —OCF₃ or —OCHF₂; and $X^1$, $X^2$, $X^3$, $X^4$, $X^1$ and $X^6$ are each independently hydrogen or fluorine, provided that at least one of $X^4$, $X^5$ and $X^6$ is fluorine.

The invention also concerns a liquid display device that includes the liquid crystal composition, and so forth.

DETAILED DESCRIPTION OF THE INVENTION

The terms used in the specification and claims are defined as follows. The liquid crystal composition and/or the liquid crystal display device of the invention may occasionally be expressed simply as "the composition" or "the device," respectively. A liquid crystal display device is a generic term for a liquid crystal display panel and a liquid crystal display module. The "liquid crystal compound" is a generic term for a compound having a liquid crystal phase such as a nematic phase, a smectic phase and so forth, and also for a compound having no liquid crystal phase but being useful as a component of a composition. The useful compound contains a 6-membered ring such as 1,4-cyclohexylene and 1,4-phenylene, and a linear molecular structure. An optically active compound may occasionally be added to the composition. Even in the case where the compound is a liquid crystal compound, the compound is classified into an additive. At least one compound selected from a group of compounds represented by formula (1) may be abbreviated to "the compound (1)." The group of compounds represented by formula (1) may also be abbreviated to "the compound (1)." The other formulas are applied with the same rules. The term "arbitrary" means not only an arbitrary position but also an arbitrary number, and the case where the number is zero is not included.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also at a high temperature in the initial stage, the composition has a large specific resistance at room temperature and also at a high temperature even after it has been used for a long time. "A voltage holding ratio is large" means that a device has a large voltage holding ratio at room temperature and also at a high temperature in the initial stage, the device has a large voltage holding ratio at room temperature and also at a high temperature even after it has been used for a long time. In the description of the characteristics, such as optical anisotropy, the characteristics of the composition such as the optical anisotropy and so forth are values measured in the methods disclosed in Examples. "A ratio of the first component" means the percentage by weight (% by weight) based on the total weight of liquid crystal composition. A ratio of the second component and so forth are applied with the same rule. A ratio of an additive mixed with the composition means the percentage by weight (% by weight) based on the total weight of liquid crystal composition.

One advantage of the invention is to provide a liquid crystal composition that satisfies many characteristics among the characteristics such as a high maximum temperature of a nematic phase, a low minimum temperature of a nematic phase, a particularly small viscosity, a suitable and large optical anisotropy, a suitable dielectric anisotropy, a large specific resistance, a high stability to ultraviolet light and a high stability to heat. Another advantage of the invention is to provide a liquid crystal composition that is properly balanced regarding many characteristics. Another advantage of the invention is to provide a liquid crystal display device that contains the liquid crystal composition. One aspect of the invention is to provide a liquid crystal composition that has a particularly small viscosity, an optical anisotropy in a range of from approximately 0.10 to approximately 0.16 and so forth, and is to provide an AM device that has a particularly short response time, a large voltage holding ratio, a large contrast ratio, a long service life and so forth.

The following compound (1) has a high dielectric anisotropy, a small viscosity and a high maximum temperature. In order to obtain high reliability, a balance among the characteristics and with a fast response, the compounds (2-1) to (2-3) and the compound (3) are selected to complete the invention. The compounds (2-1) to (2-3) have a suitable optical anisotropy, a high maximum temperature, a low minimum temperature and a small viscosity. The compound (3) has a low minimum temperature and a particularly small viscosity. Accordingly, since the compound (1) has a particularly large dielectric anisotropy and a high maximum temperature, the content of compounds having a particularly small viscosity, such as the compound (2-1) to (2-3) and the compound (3), can be increased upon compositional design of a liquid crystal composition having a certain maximum temperature and a certain dielectric anisotropy. As a result, the composition can have a small viscosity to attain fast response. A composition is prepared based on the conception, and thus such a composition has been found that has various characteristics; such as a suitable optical anisotropy, a suitable dielectric anisotropy, a particularly small viscosity, a high reliability, a high maximum temperature and a low minimum temperature. In order to attain fast response while satisfying balance among the various characteristics, it is more preferred that other compounds than the compounds (4-1) and (4-2) are not contained as a compound having a large optical anisotropy in addition to the compound (1).

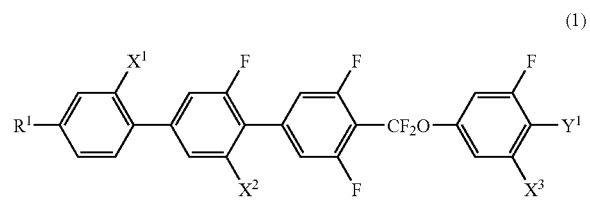
(1)

wherein $R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which is replaced by fluorine; $Y^1$ is fluorine, $-OCF_3$ or $-OCHF_2$; and $X^1$, $X^2$ and $X^3$ are each independently hydrogen or fluorine.

Component compounds capable of finely controlling the characteristics of the composition have been further investigated to complete the invention.

The invention includes the following features:

1. A liquid crystal composition having a nematic phase including three components, wherein the first component is at least one compound selected from the group of compounds represented by Formula (1), the second component is at least one compound selected from the group of compounds represented by Formulas (2-1) to (2-3), and the third component is at least one compound selected from the group of compounds represented by Formula (3):

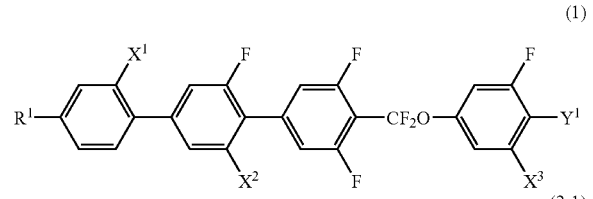
(1)

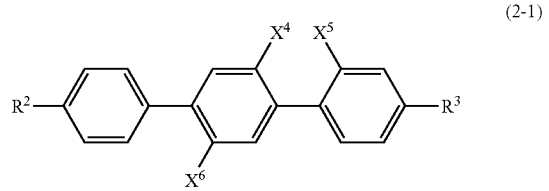
(2-1)

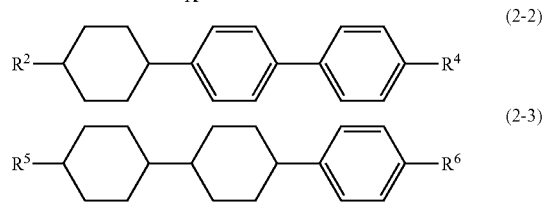
(2-2)

(2-3)

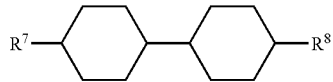
(3)

wherein $R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which is replaced by fluorine; $R^2$, $R^3$ and $R^5$ are each independently alkyl having 1 to 12 carbons, alkenyl having 2 to 12 carbons or alkenyl having 2 to 12 carbons, arbitrary hydrogen of which is replaced by fluorine; $R^4$ is fluorine, alkyl having 1 to 12 carbons or alkenyl having 2 to 12 carbons; $R^6$ is fluorine, chlorine, alkyl having 1 to 12 carbons, alkoxy having 1 to 12 carbons or alkenyl having 2 to 12 carbons; $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which is replaced by fluorine; $Y^1$ is fluorine, $-OCF_3$ or $-OCHF_2$; and $X^1$, $X^2$, $X^3$, $X^4$, $X^5$ and $X^6$ are each independently hydrogen or fluorine, provided that at least one of $X^4$, $X^5$ and $X^6$ is fluorine.

2. The liquid crystal composition according to item 1, wherein in Formula (1), $Y^1$ is fluorine, $X^1$ and $X^2$ are hydrogen, and $X^3$ is fluorine; in Formulas (2-1) to (2-3), $X^4$ is fluorine, and $X^5$ and $X^6$ are hydrogen, and in Formula (3), $R^7$ is alkenyl having 2 to 12 carbons or alkenyl having 2 to 12 carbons, arbitrary hydrogen of which is replaced by fluorine, and $R^8$ is alkyl having 1 to 12 carbons.

3. The liquid crystal composition according to item 1 or 2, wherein the second component is at least one compound selected from the group of compounds represented by Formula (2-1).

4. The liquid crystal composition according to any one of items 1 to 3, wherein the ratio of the first component is from approximately 5% by weight to approximately 25% by weight, the ratio of the second component is from approximately 15% by weight to approximately 50% by weight, and the ratio of the third component is from approximately 25% by weight to approximately 50% by weight, based on the total weight of the liquid crystal composition.

5. A liquid crystal composition having a nematic phase including four components, wherein the first component is at least one compound selected from the group of compounds represented by Formula (1), the second component is at least one compound selected from the group of compounds represented by Formulas (2-1) to (2-3), the third component is at least one compound selected from the group of compounds represented by Formula (3), and the fourth component is at least one compound selected from the group of compounds represented by Formulas (4-1) and (4-2):

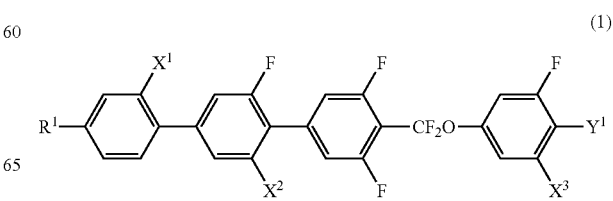
(1)

-continued

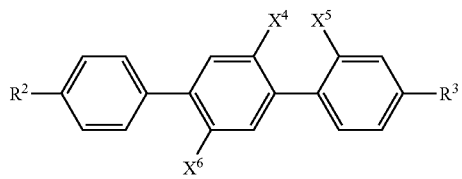 (2-1)

 (2-2)

 (2-3)

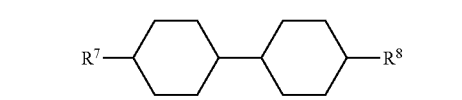 (3)

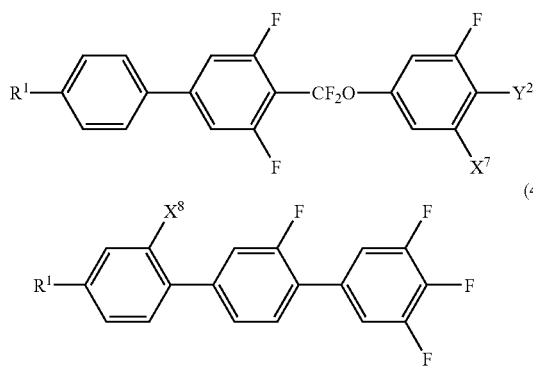 (4-1)

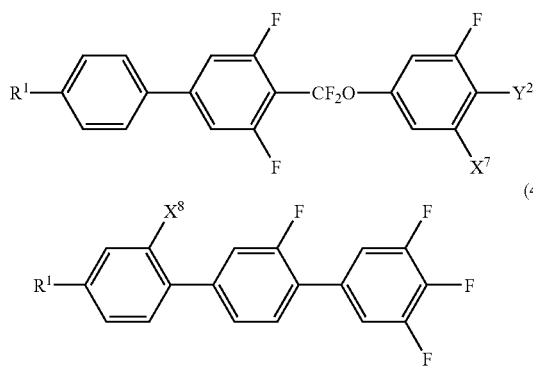 (4-2)

wherein $R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which is replaced by fluorine; $R^2$, $R^3$ and $R^5$ are each independently alkyl having 1 to 12 carbons, alkenyl having 2 to 12 carbons or alkenyl having 2 to 12 carbons, arbitrary hydrogen of which is replaced by fluorine; $R^4$ is fluorine, alkyl having 1 to 12 carbons or alkenyl having 2 to 12 carbons; $R^6$ is fluorine, chlorine, alkyl having 1 to 12 carbons, alkoxy having 1 to 12 carbons or alkenyl having 2 to 12 carbons; $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which is replaced by fluorine; $Y^1$ is fluorine, —$OCF_3$ or —$OCHF_2$; $Y^2$ is fluorine or —$OCF_3$; and $X^1$, $X^2$, $X^3$, $X^4$, $X^5$, $X^6$, $X^7$ and $X^8$ are each independently hydrogen or fluorine, provided that at least one of $X^4$, $X^5$ and $X^6$ is fluorine.

6. The liquid crystal composition according to item 5, wherein in Formula (1), $Y^1$ is fluorine, $X^1$ and $X^2$ are hydrogen, and $X^3$ is fluorine; in Formulas (2-1) to (2-3), $X^4$ is fluorine, and $X^5$ and $X^6$ are hydrogen, and in Formula (3), $R^7$ is alkenyl having 2 to 12 carbons or alkenyl having 2 to 12 carbons, arbitrary hydrogen of which is replaced by fluorine, and $R^8$ is alkyl having 1 to 12 carbons.

7. The liquid crystal composition according to item 5 or 6, wherein the second component is at least one compound selected from the group of compounds represented by Formula (2-1).

8. The liquid crystal composition according to any one of items 5 to 7, wherein the ratio of the first component is from approximately 5% by weight to approximately 25% by weight, the ratio of the second component is from approximately 15% by weight to approximately 50% by weight, the ratio of the third component is from approximately 25% by weight to approximately 50% by weight, and the ratio of the fourth component is from approximately 5% by weight to approximately 20% by weight, based on the total weight of the liquid crystal composition.

9. A liquid crystal composition having a nematic phase including three components, wherein the first component is at least one compound selected from the group of compounds represented by Formula (1), the second component is at least one compound selected from the group of compounds represented by Formulas (2-1) to (2-3), and the third component is at least one compound selected from the group of compounds represented by Formula (3), and the liquid crystal composition consists essentially of the first component, the second component and the third component:

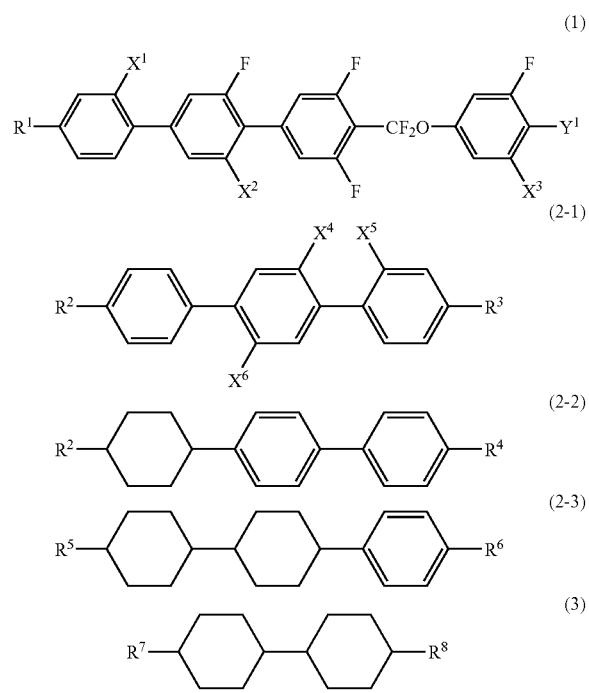

(1)

(2-1)

(2-2)

(2-3)

(3)

wherein $R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which is replaced by fluorine; $R^2$, $R^3$ and $R^5$ are each independently alkyl having 1 to 12 carbons, alkenyl having 2 to 12 carbons or alkenyl having 2 to 12 carbons, arbitrary hydrogen of which is replaced by fluorine; $R^4$ is fluorine, alkyl having 1 to 12 carbons or alkenyl having 2 to 12 carbons; $R^6$ is fluorine, chlorine, alkyl having 1 to 12 carbons, alkoxy having 1 to 12 carbons or alkenyl having 2 to 12 carbons; $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which is replaced by fluorine; $Y^1$ is fluorine, —$OCF_3$ or —$OCHF_2$;

and $X^1$, $X^2$, $X^3$, $X^4$, $X^5$ and $X^6$ are each independently hydrogen or fluorine, provided that at least one of $X^4$, $X^5$ and $X^6$ is fluorine.

10. A liquid crystal composition having a nematic phase including four components, wherein the first component is at least one compound selected from the group of compounds represented by Formula (1), the second component is at least one compound selected from the group of compounds represented by Formulas (2-1) to (2-3), the third component is at least one compound selected from the group of compounds represented by Formula (3), and the fifth component is at least one compound selected from the group of compounds represented by Formula (5), and the liquid crystal composition consists essentially of the first component, the second component, the third component and the fifth component:

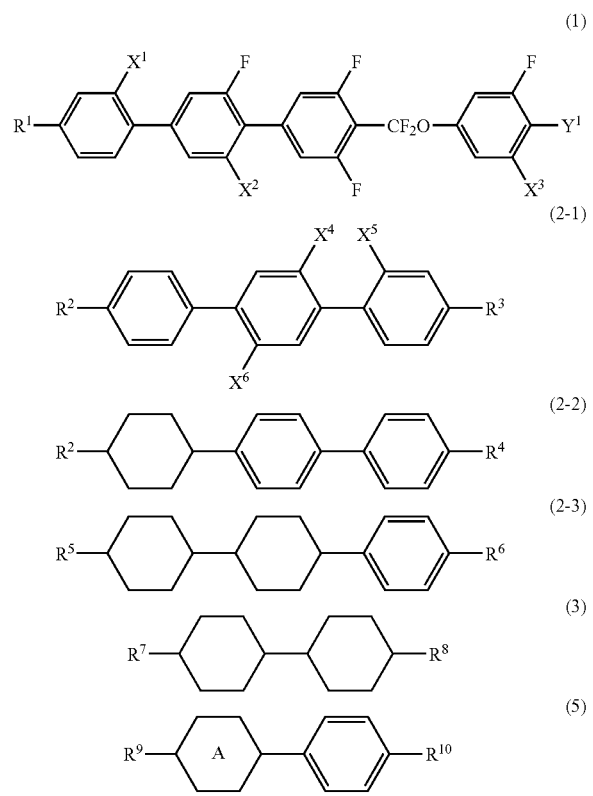

wherein $R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which is replaced by fluorine; $R^2$, $R^3$ and $R^5$ are each independently alkyl having 1 to 12 carbons, alkenyl having 2 to 12 carbons or alkenyl having 2 to 12 carbons, arbitrary hydrogen of which is replaced by fluorine; $R^4$ is fluorine, alkyl having 1 to 12 carbons or alkenyl having 2 to 12 carbons; $R^6$ is fluorine, chlorine, alkyl having 1 to 12 carbons, alkoxy having 1 to 12 carbons or alkenyl having 2 to 12 carbons; $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which is replaced by fluorine; $R^9$ is independently alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which is replaced by fluorine; $R^{10}$ is independently alkyl having 1 to 12 carbons, alkoxy having 1 to 12 carbons, alkoxyalkyl having 2 to 12 carbons, alkenyl having 2 to 12 carbons, alkenyl having 2 to 12 carbons, arbitrary hydrogen of which is replaced by fluorine, fluorine or chlorine; ring A is cyclohexylene or phenylene; $Y^1$ is fluorine, —$OCF_3$ or —$OCHF_2$; and $X^1$, $X^2$, $X^3$, $X^4$, $X^5$ and $X^6$ are each independently hydrogen or fluorine, provided that at least one of $X^4$, $X^5$ and $X^6$ is fluorine.

11. A liquid crystal composition having a nematic phase including four components, wherein the first component is at least one compound selected from the group of compounds represented by Formula (1), the second component is at least one compound selected from the group of compounds represented by Formulas (2-1) to (2-3), the third component is at least one compound selected from the group of compounds represented by Formula (3), and the fourth component is at least one compound selected from the group of compounds represented by Formulas (4-1) and (4-2), and the liquid crystal composition consists essentially of the first component, the second component, the third component and the fourth component:

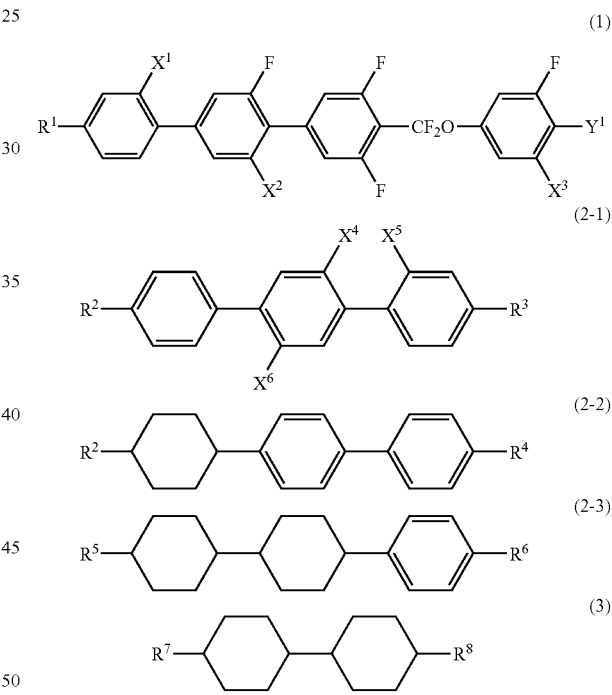

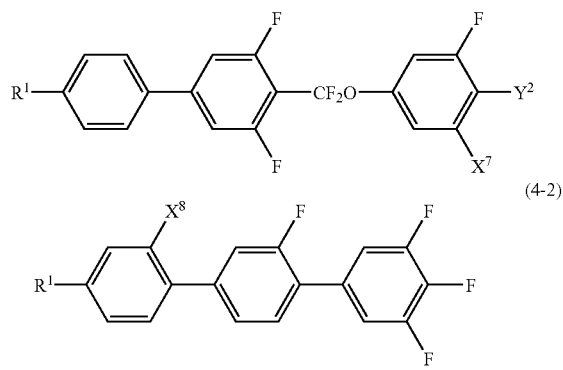

wherein $R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which is replaced by fluorine; $R^2$, $R^3$ and $R^5$ are each independently alkyl having 1 to 12 carbons, alkenyl having 2 to 12 carbons or alkenyl having 2 to 12 carbons, arbitrary hydrogen of which is replaced by fluorine; $R^4$ is fluorine, alkyl having 1 to 12 carbons or alkenyl having 2 to 12 carbons; $R^6$ is fluorine, chlorine, alkyl having 1 to 12 carbons, alkoxy having 1 to 12 carbons or alkenyl having 2 to 12 carbons; $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which is replaced by fluorine; $Y^1$ is fluorine, —$OCF_3$ or —$OCHF_2$; $Y^2$ is fluorine or —$OCF_3$; and $X^1$, $X^2$, $X^3$, $X^4$, $X^5$, $X^6$, $X^7$ and $X^8$ are each independently hydrogen or fluorine, provided that at least one of $X^4$, $X^1$ and $X^6$ is fluorine.

12. A liquid crystal composition having a nematic phase including five components, wherein the first component is at least one compound selected from the group of compounds represented by Formula (1), the second component is at least one compound selected from the group of compounds represented by Formulas (2-1) to (2-3), the third component is at least one compound selected from the group of compounds represented by Formula (3), the fourth component is at least one compound selected from the group of compounds represented by Formulas (4-1) and (4-2), and the fifth component is at least one compound selected from the group of compounds represented by Formula (5), and the liquid crystal composition consists essentially of the first component, the second component, the third component, the fourth component and the fifth component:

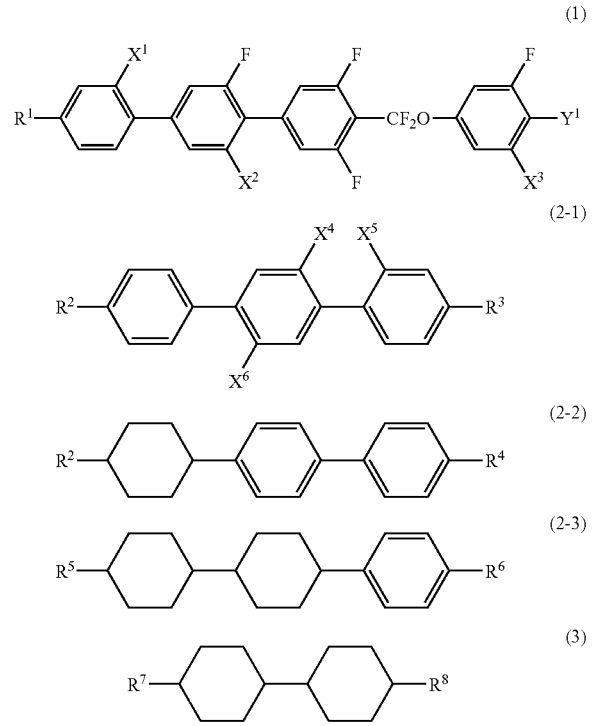

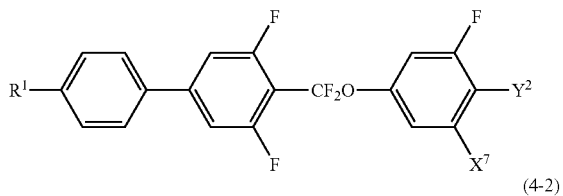

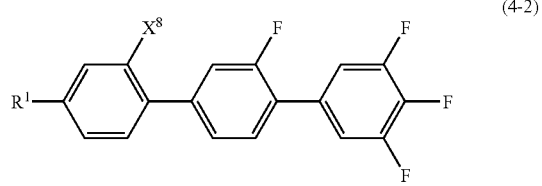

wherein $R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which is replaced by fluorine; $R^2$, $R^3$ and $R^5$ are each independently alkyl having 1 to 12 carbons, alkenyl having 2 to 12 carbons or alkenyl having 2 to 12 carbons, arbitrary hydrogen of which is replaced by fluorine; $R^4$ is fluorine, alkyl having 1 to 12 carbons or alkenyl having 2 to 12 carbons; $R^6$ is fluorine, chlorine, alkyl having 1 to 12 carbons, alkoxy having 1 to 12 carbons or alkenyl having 2 to 12 carbons; $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which is replaced by fluorine; $R^9$ is independently alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which is replaced by fluorine; $R^{10}$ is independently alkyl having 1 to 12 carbons, alkoxy having 1 to 12 carbons, alkoxyalkyl having 2 to 12 carbons, alkenyl having 2 to 12 carbons, alkenyl having 2 to 12 carbons, arbitrary hydrogen of which is replaced by fluorine, fluorine or chlorine; ring A is cyclohexylene or phenylene; $Y^1$ is fluorine, —$OCF_3$ or —$OCHF_2$; $Y^2$ is fluorine or —$OCF_3$; and $X^1$, $X^2$, $X^3$, $X^4$, $X^5$, $X^6$, $X^7$ and $X^8$ are each independently hydrogen or fluorine, provided that at least one of $X^4$, $X^1$ and $X^6$ is fluorine.

13. The liquid crystal composition according to any one of items 1 to 12, wherein the composition has a maximum temperature of a nematic phase of from approximately 70° C. to approximately 95° C., at a wavelength of 589 nm an optical anisotropy (25° C.) of from approximately 0.10 to approximately 0.16, a dielectric anisotropy (25° C., 1 kHz) of from approximately 3 to approximately 7, and a rotation viscosity (25° C.) of from approximately 30 mPa·s to approximately 100 mPa·s.

14. A liquid display device that includes the liquid crystal composition according to any one of items 1 to 13.

The invention further includes: (1) the composition described above, wherein the composition further contains an optically active compound; (2) the composition described above, wherein the composition further contains an additive, such, an antioxidant, an ultraviolet light absorbent and/or a antifoaming agent; (3) an AM device containing the composition described above; (4) a device having a TN, ECB, OCB or IPS, containing the composition described above; (5) a device of a transmission type, containing the composition described above; (6) use of the composition described above as a composition having a nematic phase; and (7) use as an optically active composition by adding an optically active compound to the composition described above.

The composition of the invention will be explained in the following order. First, the constitution of component compounds in the composition will be explained. Second, the main characteristics of the component compounds and the main effects of the compounds on the composition will be explained. Third, a desirable ratio of the component compounds and the basis thereof will be explained. Fourth, a desirable embodiment of the component compounds will be explained. Fifth, examples of the component compound will be shown. Sixth, the preparation methods of the component compound will be explained. Seventh, additives that may be added to the composition will be explained. Lastly, use of the composition will be explained.

First, the constitution of component compounds in the composition will be explained. The composition of the invention is classified into the composition A and the composition B. The composition A may further contain a liquid crystal compound, an additive, an impurity, and so forth. This liquid crystal compound is different from the compound (1), the compounds (2-1), (2-2) and (2-3), the compound (3), the compounds (4-1) and (4-2), and the compound (5). Such a compound is mixed with the composition for the purpose of adjusting the characteristics of the composition. The additive includes an optically active compound, a coloring matter, an antioxidant, an ultraviolet light absorbent and so forth. The impurity is a compound and so forth contaminated in the process such as the synthesis of a component compound and so forth.

The composition B consists essentially of the compounds selected from the compound (1), the compounds (2-1), (2-2) and (2-3), the compounds (3) and (4-1), the compound (4-2) and the compound (5). The term "essentially" means that the composition does not contain a liquid crystal compound which is different from these compounds. The term "essentially" also means that the composition may further contain the additive, the impurity, and so forth. The composition B is preferable to the composition A from the viewpoint of fast response. The components of the composition B are fewer than those of the composition A. The composition B is preferable to the composition A from the viewpoint of costs.

Second, the main characteristics of the component compounds and the main effects of the compounds on the composition will be explained. The main characteristics of the component compounds are summarized in Table 2 according to the advantages of the invention. In Table 2, the symbol "L" represents large or high, the symbol "M" represents a middle degree, and the symbol "S" represents small or low.

TABLE 2

| Characteristics of Compounds | | | | | | | | |
|---|---|---|---|---|---|---|---|---|
| | Compound | | | | | | | |
| | (1) | (2-1) | (2-2) | (2-3) | (3) | (4-1) | (4-2) | (5) |
| Maximum Temperature | L | L | L | L | M | S | S | S |
| Viscosity | L | M | M | M | S | L | L | M |
| Optical Anisotropy | L | L | M | M | S | M | M | M |

TABLE 2-continued

| Characteristics of Compounds | | | | | | | | |
|---|---|---|---|---|---|---|---|---|
| | Compound | | | | | | | |
| | (1) | (2-1) | (2-2) | (2-3) | (3) | (4-1) | (4-2) | (5) |
| Dielectric Anisotropy | L | S | S | S | S | M | M | S |
| Specific Resistance | L | L | L | L | L | L | L | L |

The main effects of the component compounds to the characteristics of the composition upon mixing the component compounds to the composition are as follows. The compound (1) increases the dielectric anisotropy, increases the optical anisotropy, and increases the maximum temperature. The compounds (2-1) to (2-3) increase a maximum temperature, decrease the minimum temperature, decrease the viscosity, and control the optical anisotropy suitably. The compound (3) decreases the optical anisotropy, decreases the minimum temperature, and particularly decreases the viscosity largely. The compounds (4-1) and (4-2) decrease the minimum temperature, and increase the dielectric anisotropy. The compound (5) decreases the minimum temperature, decreases the viscosity, and controls the optical anisotropy.

Third, desirable ratios of the component compounds and the basis therefor will be explained. A desirable ratio of the first component is approximately 5% by weight or more for increasing the dielectric anisotropy, increasing the optical anisotropy and increasing the maximum temperature, and is approximately 25% by weight or less for decreasing the minimum temperature. A more desirable ratio is from approximately 5% by weight to approximately 20% by weight. A particularly desirable ratio is from approximately 5% to approximately 18%.

A desirable ratio of the second component is approximately 15% by weight or more for increasing the maximum temperature, decreasing the minimum temperature and decreasing the viscosity, and is approximately 50% by weight or less for decreasing the minimum temperature and increasing the dielectric anisotropy. A more desirable ratio is from approximately 15% by weight to approximately 45% by weight. A particularly desirable ratio is from approximately 15% by weight to approximately 45% by weight.

A desirable ratio of the third component is approximately 25% by weight or more for decreasing the viscosity, and is approximately 50% by weight or less for increasing the dielectric anisotropy. A more desirable ratio is from approximately 25% by weight to approximately 45% by weight. A particularly desirable ratio is from approximately 30% by weight to approximately 45% by weight.

The fourth component is an optional component and is suitable for preparing a composition having a particularly low minimum temperature and a suitable dielectric anisotropy. A desirable ratio of the fourth component is approximately 20% by weight or less for decreasing the minimum temperature and decreasing the viscosity. A more desirable ratio is approximately 18% by weight or less.

The fifth component is an optional component and is suitable for preparing a composition having a particularly low minimum temperature and a suitable optical anisotropy. A desirable ratio of the fifth component is approximately 15% by weight or less for decreasing the minimum temperature and increasing the maximum temperature. A more desirable ratio is approximately 10% by weight or less.

In the composition A described above, a desirable total ratio of the first component, the second component, the third component, the fourth component and the fifth component is approximately 70% by weight or more for obtaining good characteristics. A more desirable total ratio is approximately 90% by weight or more. In the composition B described above, a total ratio of the five components is 100%.

Fourth, a desirable embodiment of the component compound will be explained.

$R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which are replaced by fluorine. Desirable $R^1$ is alkyl having 1 to 12 carbons or alkenyl having 2 to 12 carbons for increasing the dielectric anisotropy, decreasing the minimum temperature and decreasing the viscosity. More desirable $R^1$ is alkyl having 1 to 5 carbons. $R^2$, $R^3$ and $R^5$ are each independently alkyl having 1 to 12 carbons, alkenyl having 2 to 12 carbons or alkenyl having 2 to 12 carbons, arbitrary hydrogen of which are replaced by fluorine. Desirable $R^2$, $R^3$ and $R^5$ are alkyl having 1 to 8 carbons, alkenyl having 2 to 8 carbons or alkenyl having 2 to 8 carbons, arbitrary hydrogen of which are replaced by fluorine, for decreasing the minimum temperature and decreasing the viscosity. More desirable $R^2$, $R^3$ and $R^5$ are alkyl having 1 to 8 carbons or alkenyl having 2 to 8 carbons. $R^4$ is fluorine, alkyl having 1 to 12 carbons or alkenyl having 2 to 12 carbons. Desirable $R^4$ is fluorine or alkyl having 1 to 12 carbons for decreasing the minimum temperature and decreasing the viscosity. More desirable $R^4$ is fluorine or alkyl having 1 to 8 carbons. Preferably $R^4$ is fluorine. $R^6$ is fluorine, chlorine, alkyl having 1 to 12 carbons, alkoxy having 1 to 12 carbons or alkenyl having 2 to 12 carbons. Desirable $R^6$ is chlorine or alkyl having 1 to 12 carbons for decreasing the minimum temperature and decreasing the viscosity. More desirable $R^6$ is chlorine or alkyl having 1 to 8 carbons. Particularly desirable $R^6$ is chlorine. $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which are replaced by fluorine. Desirable $R^7$ and $R^8$ are alkyl having 1 to 12 carbons, alkenyl having 2 to 12 carbons, alkadienyl having 4 to 12 carbons or alkenyl having 2 to 12 carbons, arbitrary hydrogen of which are replaced by fluorine, for decreasing the minimum temperature and decreasing the viscosity. More desirable $R^7$ and $R^8$ are such combinations that $R^7$ is alkenyl having 2 to 12 carbons, dialkenyl having 4 to 12 carbons or alkenyl having 2 to 12 carbons, arbitrary hydrogen of which are replaced by fluorine, and $R^8$ is alkyl having 1 to 12 carbons. Particularly desirable $R^7$ and $R^8$ are such combinations that $R^7$ is alkenyl having 2 to 5 carbons, and $R^8$ is alkyl having 1 to 5 carbons. $R^9$ is independently alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which are replaced by fluorine. Desirable $R^9$ are alkyl having 1 to 12 carbons, alkenyl having 2 to 12 carbons or alkenyl having 2 to 12 carbons, arbitrary hydrogen of which are replaced by fluorine, for increasing the maximum temperature and decreasing the viscosity. More desirable $R^9$ is alkenyl having 2 to 12 carbons. $R^{10}$ is independently alkyl having 1 to 12 carbons, alkoxy having 1 to 12 carbons, alkoxyalkyl having 2 to 12 carbons, alkenyl having 2 to 12 carbons, alkenyl having 2 to 12 carbons, arbitrary hydrogen of which are replaced by fluorine, fluorine or chlorine. Desirable $R^{10}$ are alkyl having 1 to 12 carbons, alkoxy having 1 to 12 carbons, alkenyl having 2 to 12 carbons, fluorine or chlorine for increasing the maximum temperature and decreasing the viscosity. More desirable $R^{10}$ is alkyl having 1 to 12 carbons, fluorine or chlorine.

Desirable alkyl are methyl, ethyl, propyl, butyl, pentyl, hexyl, heptyl, or octyl. More desirable alkyl are ethyl, propyl, butyl, pentyl, or heptyl for decreasing the viscosity.

Desirable alkenyl are vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl are vinyl, 1-propenyl, 3-butenyl, or 3-pentenyl for decreasing the viscosity. A desirable configuration of —CH=CH— in these alkenyls depends on the position of a double bond. Trans is desirable in the alkenyl such as 1-propenyl, 1-butenyl, 1-pentenyl, 1-hexenyl, 3-pentenyl, and 3-hexenyl for decreasing a viscosity. Cis desirable in the alkenyl such as 2-butenyl, 2-pentenyl and 2-hexenyl. In these alkenyls, linear alkenyl is preferable to branched alkenyl.

Ring A is cyclohexylene or phenylene. Particularly desirable ring A is phenylene for increasing the refractive index anisotropy.

On the configuration of 1,4-cyclohexylene in the compounds, trans is preferable to cis for increasing the maximum temperature.

$X^1$, $X^2$, $X^3$, $X^4$, $X^5$, $X^6$, $X^7$ and $X^8$ are each independently hydrogen or fluorine, provided that at least one of $X^4$, $X^5$ and $X^6$ is fluorine. In Formula (1) of the first component, desirable $X^1$, $X^2$ and $X^3$ are fluorine, hydrogen and fluorine, or hydrogen, hydrogen and fluorine, in this order for increasing the dielectric anisotropy, decreasing the minimum temperature and decreasing the viscosity. Particularly desirable $X^1$, $X^2$ and $X^3$ are hydrogen, hydrogen and fluorine in this order. In the compound (2-1), desirable $X^4$, $X^5$ and $X^6$ are fluorine, hydrogen and hydrogen, hydrogen, hydrogen and fluorine, or fluorine, fluorine and hydrogen, in this order for decreasing the minimum temperature and decreasing the viscosity. More desirable $X^4$, $X^5$ and $X^6$ are fluorine, hydrogen and hydrogen in this order.

$Y^1$ is fluorine, —$OCF_3$ or —$OCHF_2$. Desirable $Y^1$ is fluorine, —$OCF_3$ for decreasing the minimum temperature, increasing the dielectric anisotropy and decreasing the viscosity. More desirable $Y^1$ is fluorine. $Y^2$ is fluorine or —$OCF_3$. Particularly desirable $Y^2$ is fluorine for increasing the dielectric anisotropy and decreasing the viscosity.

Fifth, examples of the component compound will be shown. In the desirable compounds described below, $R^1$ is alkyl having 1 to 12 carbons, alkenyl having 2 to 12 carbons or alkenyl having 2 to 12 carbons, arbitrary hydrogen of which are replaced by fluorine; $R^2$ and $R^3$ are each independently alkyl having 1 to 12 carbons, alkenyl having 2 to 12 carbons or alkenyl having 2 to 12 carbons, arbitrary hydrogen of which are replaced by fluorine; $R^{11}$ is alkyl having 1 to 12 carbons, alkenyl having 2 to 12 carbons or alkenyl having 2 to 12 carbons, arbitrary hydrogen of which are replaced by fluorine; $R^{12}$ is alkyl having 1 to 12 carbons or alkoxy having 1 to 12 carbons; and $R^{13}$ is alkyl having 1 to 12 carbons, $R^9$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which are replaced by fluorine, $R^{10}$ is alkyl having 1 to 12 carbons, alkoxy having 1 to 12 carbons, alkoxyalkyl having 2 to 12 carbons, alkenyl having 2 to 12 carbons, alkenyl having 2 to 12 carbons, arbitrary hydrogen of which are replaced by fluorine, fluorine or chlorine. In these compounds, trans is preferable to cis for the configuration of 1,4-cyclohexylene for increasing the maximum temperature.

The symbol $R^1$, for example, is used for many compounds in the chemical formulas for the component compounds. $R^1$ may be identical or different in these compounds. In one case, for example, $R^1$ of the compound (1-1) is ethyl and $R^1$ of the compound (4-1-1) is ethyl. In another case, $R^1$ of the compound (1-1) is ethyl and $R^1$ of the compound (4-1-1) is propyl. This rule is also applicable to the symbols $R^2$ to $R^{11}$ and so forth. CL is chlorine.

Desirable compounds (1) are the compounds (1-1) to (1-24). More desirable compounds (1) are the compounds (1-8), (1-16) and (1-24) for decreasing the minimum temperature and decreasing the viscosity. A particularly desirable compound (1) is the compound (1-8).

Desirable compounds (2-1) are the compounds (2-1-1) to (2-1-3). A more desirable compound (2-1) is the compound (2-1-1) for decreasing the minimum temperature and decreasing the viscosity.

Desirable compounds (2-2) are the compounds (2-2-1) and (2-2-2). A more desirable compound (2-2) is the compound (2-2-2) for decreasing the minimum temperature and decreasing the viscosity.

Desirable compounds (2-3) are the compounds (2-3-1) to (2-3-3). More desirable compounds (2-3) are the compounds (2-3-1) and (2-2-3) for decreasing the minimum temperature and decreasing the viscosity.

Desirable compounds (3) are the compounds (3-1) to (3-8). More desirable compounds (3) are the compounds (3-2), (3-3) and (3-8) for decreasing the minimum temperature and decreasing the viscosity. A particularly desirable compound (3) is the compound (3-2).

Desirable compounds (4-1) are the compounds (4-1-1) to (4-1-4). More desirable compounds (4-1) are the compounds (4-1-2) and (4-1-3) for decreasing the minimum temperature, increasing the dielectric anisotropy and decreasing the viscosity. A particularly desirable compound (4-1) is the compound (4-1-2).

Desirable compounds (4-2) are the compounds (4-2-1) and (4-2-2). A more desirable compound (4-2) is the compound (4-2-1) for decreasing the minimum temperature.

Desirable compounds (5) are the compounds (5-1) and (5-2). A more desirable compound (5) is the compound (5-2) for decreasing the minimum temperature.

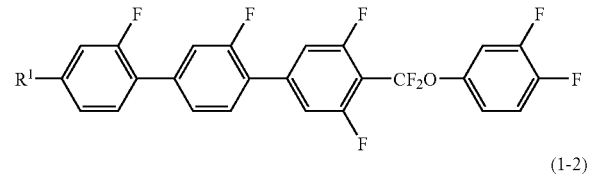

-continued
(1-13)
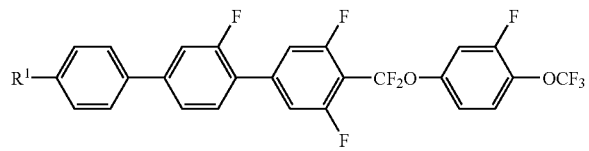
(1-14)
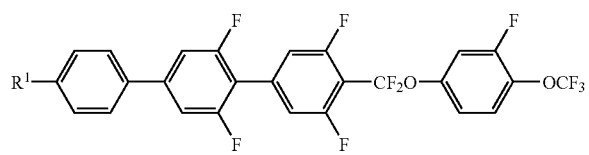
(1-15)
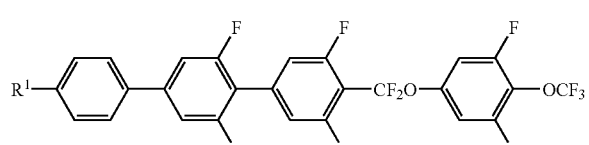
(1-16)
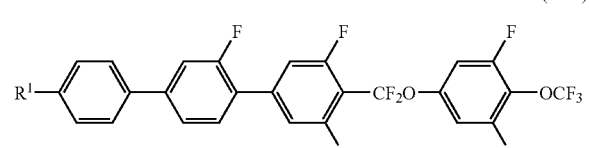
(1-17)
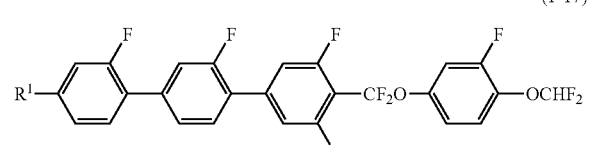
(1-18)
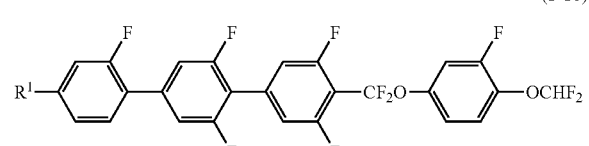
(1-19)
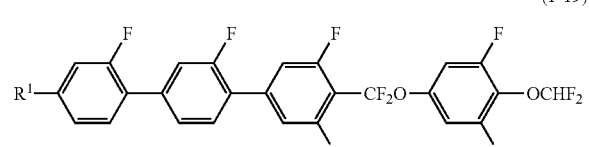
(1-20)
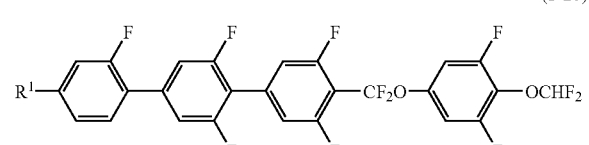
(1-21)
-continued
(1-22)
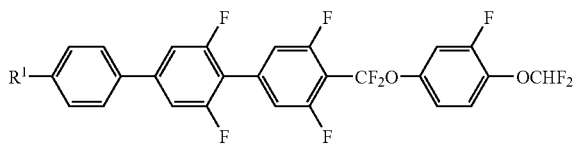
(1-23)
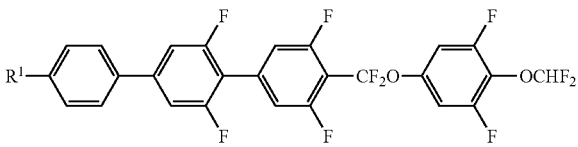
(1-24)
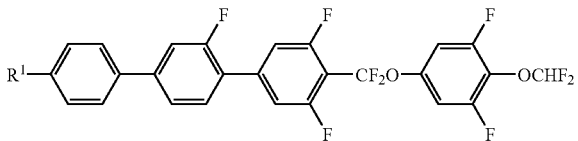
(2-1-1)
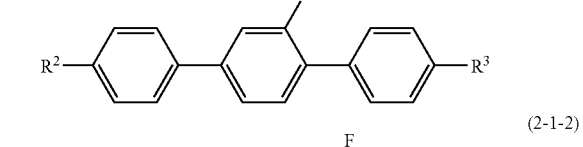
(2-1-2)
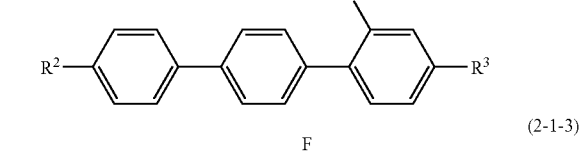
(2-1-3)
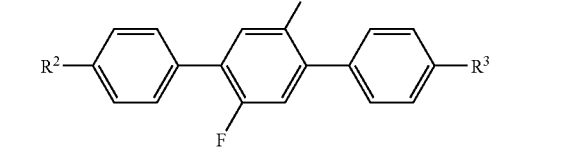
(2-2-1)
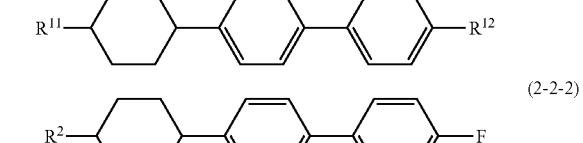
(2-2-2)
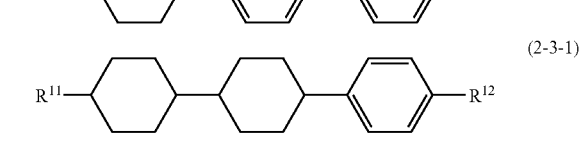
(2-3-1)
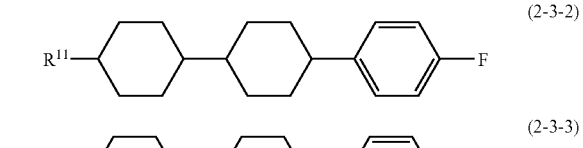
(2-3-2)
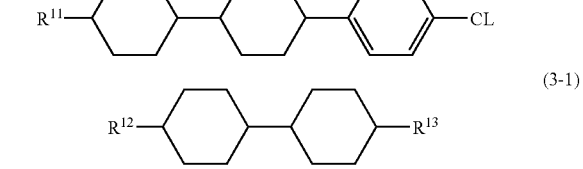
(2-3-3)
(3-1)

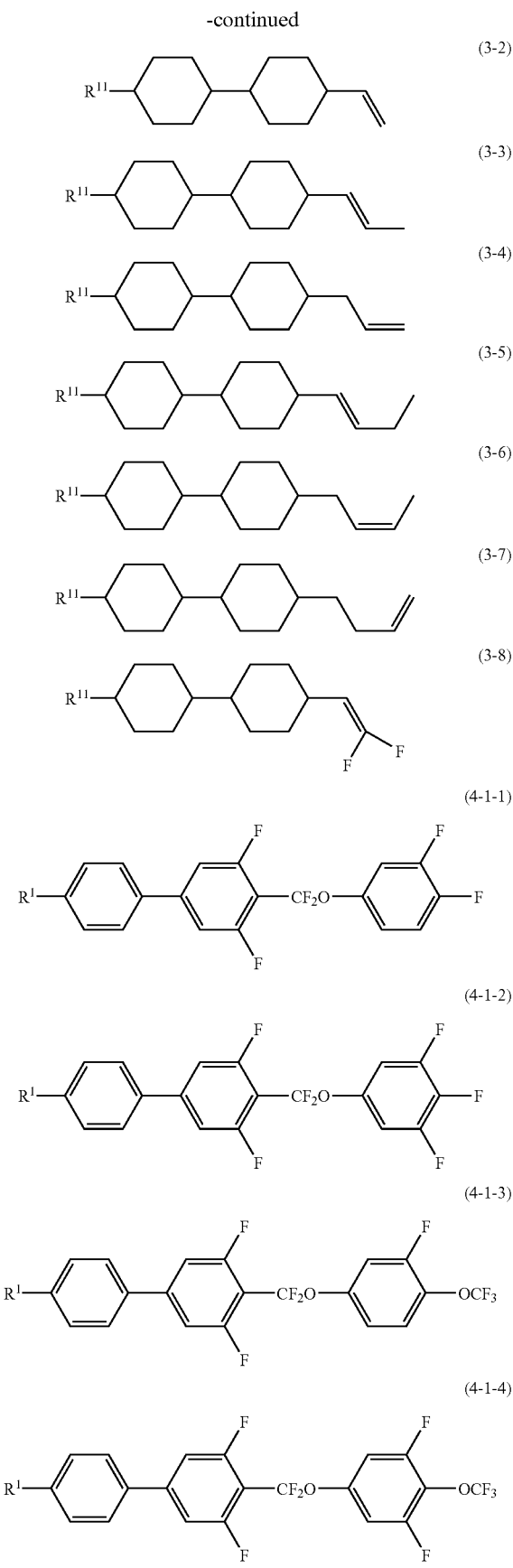

Sixth, the preparation methods of the component compounds will be explained. These compounds can be prepared by known methods. The preparation method will be exemplified below. The compound (2-1-1) is prepared by the method disclosed in JP S60-51135 A/1985. The compound (2-3-1) is prepared by the method disclosed in JP S57-165328 A/1982. The compound (2-3-2) is prepared by the method disclosed in JP S57-64626 A/1982. The compound (2-3-3) is prepared by the method disclosed in JP S57-114531 A/1982. The compound (3-1) is prepared by the method disclosed in JP S59-70624 A/1984. The compound (3-2) is prepared by the method disclosed in JP H4-30382 A/1992. The compound (3-8) is prepared by the method disclosed in JP H1-308239 A/1989. The compound (1-8) is prepared by the similar method as the compound (3-8). The compounds (4-1-2) and (4-1-3) are prepared by the method disclosed in JP H 10-251186 A/1998. The compound (5-1) is prepared by the method disclosed in JP S56-68636 A/1981. The compound (5-2) is prepared by the method disclosed in JP S61-27931 A/1986.

The compounds for which preparation methods were not described above can be prepared according to the methods described in ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth.

Seventh, additives capable of being mixed with the composition will be explained. The additives include an optically active compound, a coloring matter, an antioxidant, an ultraviolet light absorbent and so forth. An optically active compound is mixed in the composition for inducing a helical structure of liquid crystal to provide a twist angle. Examples of the optically active compound include the compounds (6-1) to (6-4) below. A desirable ratio of the optically active compound is approximately 5% by weight or less, and a more desirable ratio thereof ranges from approximately 0.01% by weight to approximately 2%.

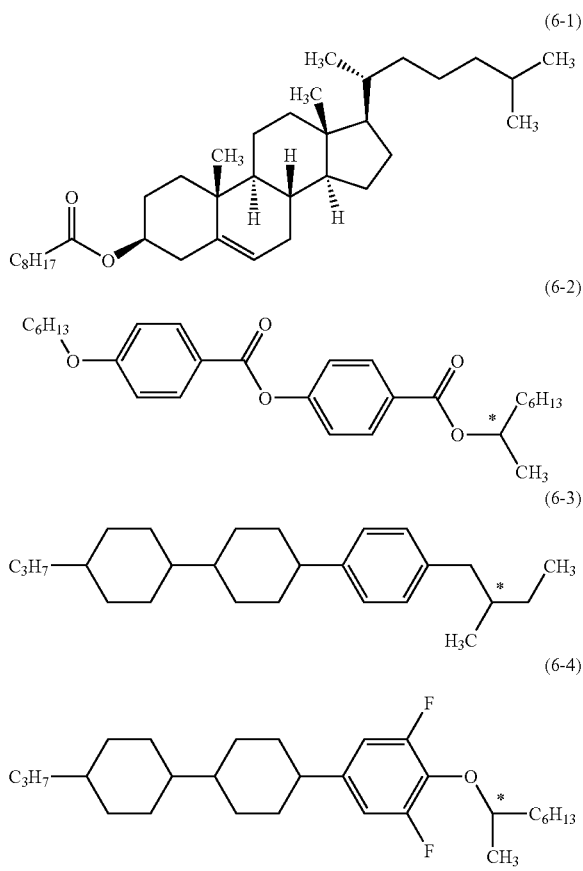

(6-1)
(6-2)
(6-3)
(6-4)

A dye is mixed with the composition to suit for a device of a Guest Host (GH) mode. A desirable ratio of the dye ranges from approximately 0.01% to approximately 10%. An antioxidant is mixed with the composition in order to avoid a decrease in specific resistance caused by heating in the air, or to maintain a large voltage holding ratio at room temperature and also at a high temperature even after the device has been used for a long time. A desirable ratio of the antioxidant is approximately 50 ppm or more for obtaining the advantage thereof and is approximately 600 ppm or less for preventing the maximum temperature from being decreased and preventing the minimum temperature from being increased. A more desirable ratio thereof ranges from approximately 100 ppm to approximately 300 ppm.

Preferred examples of the antioxidant include the compound (7):

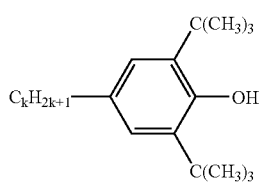

(7)

wherein k is an integer of from 1 to 9. In the compound (7), desirable k are 1, 3, 5, 7, or 9. More desirable k are 1 or 7. When k is 1, the compound (7) has a large volatility, and is effective in preventing the decrease of specific resistance caused by heating in the air. When k is 7, the compound (7) has a small volatility, and is effective in maintaining a large voltage holding ratio at room temperature and also at a high temperature even after the device has been used for a long time.

Preferred examples of the ultraviolet light absorbent include a benzophenone derivative, a benzoate derivative and a triazole derivative. A desirable ratio of the ultraviolet light absorbent is approximately 50 ppm or more for obtaining the advantage thereof and is approximately 10,000 ppm or less for preventing the maximum temperature from being decreased and preventing the minimum temperature from being increased. A more desirable ratio thereof ranges from approximately 100 ppm to approximately 5,000 ppm.

Last, use of the composition will be explained. Most of the compositions have a minimum temperature of approximately −20° C. or less, a maximum temperature of 70° C. or more, and an optical anisotropy of approximately 0.10 to approximately 0.16. The device containing the composition has a large voltage holding ratio. The composition is suitable for an AM device. The composition is suitable especially for an AM device of a transmission type. The composition having an optical anisotropy of approximately 0.10 to approximately 0.16 and further having an optical anisotropy of approximately 0.08 to approximately 0.30 may be prepared by controlling ratios of the component compounds or by mixing other liquid crystal compounds. The composition can be used as a composition having a nematic phase and as an optically active composition by adding an optically active compound.

The composition can be used for an AM device. It can also be used for a PM device. The composition can also be used for a device having a mode such as PC, TN, STN, ECB, OCB, IPS, VA, and so forth. It is desirable to use the composition for a device having a mode of TN or OCB. These devices may be of a reflection type, a transmission type or a semi-transmission type. It is desirable to use the composition for a device of a transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three dimensional net-work polymer is formed in the composition, for example, a polymer network (PN) device.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be explained in detail by way of Examples. The invention is not limited by the Examples described below. The compounds described in the Comparative Examples and the Examples are expressed by the symbols according to the definition in Table 3. In Table 3, the configuration of 1,4-cyclohexylene and 1,3-dioxane-2,5-diyl is trans. The configuration regarding a bonding group of —CH═CH— is trans. The parenthesized number next to the symbolized compounds in the Examples corresponds to the number of the desirable compound. The symbol (−) means other liquid crystal compound. A ratio (percentage) of a liquid crystal composition is percentage by weight (% by weight) based on the total weight of a liquid crystal composition.

TABLE 3

Method of Description of Compound using Symbols
R—(A$_1$)—Z$_1$ ... Z$_n$—(A$_n$)—R'

| | Symbol |
|---|---|
| 1) Left Terminal Group R- | |
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |
| C$_n$H$_{2n+1}$—CH=CH— | nV— |
| CH$_2$=CH—C$_n$H$_{2n}$— | Vn- |
| C$_m$H$_{2m+1}$—CH=CH—C$_n$H$_{2n}$— | mVn- |
| CH$_2$=CH—C$_2$H$_4$—CH=CH—C$_2$H$_4$— | V2V2- |
| CF$_2$=CH— | VFF— |
| CF$_2$=CH—C$_2$H$_4$— | VFF2- |
| 2) Right Terminal Group —R' | |
| —C$_n$H$_{2n+1}$ | -n |
| —OC$_n$H$_{2+1}$ | —On |
| —F | —F |
| —Cl | —CL |
| —OCF$_3$ | —OCF$_3$ |
| —OCF$_2$CFHCF$_3$ | —OCF2CFHCF3 |
| —CH=CHC$_n$H$_{2n+1}$ | —Vn |
| 3) Bonding group —Z$_n$— | |
| —C$_2$H$_4$— | 2 |
| —COO— | E |
| —CH=CH— | V |
| —C≡C— | T |
| —CF$_2$O— | X |
| 4) Ring Structure —A$_n$— | |
|  | H |
| 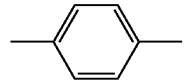 | B |
|  | B(F) |
| 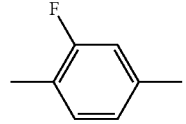 | B(2F) |
| 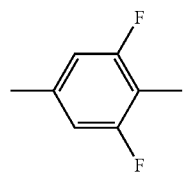 | B(F,F) |

TABLE 3-continued

Method of Description of Compound using Symbols
R—(A$_1$)—Z$_1$ ... Z$_n$—(A$_n$)—R'

| | Symbol |
|---|---|
| 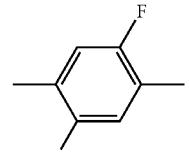 | B(2F,5F) |
| 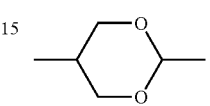 | G |

5) Example of Description

Example 1 3-BB(F)B(F,F)XB(F,F)-F

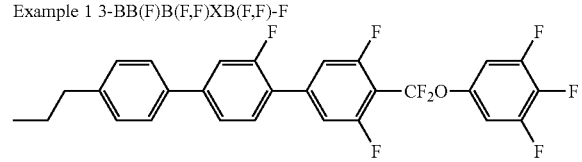

Example 2 V-HH-3

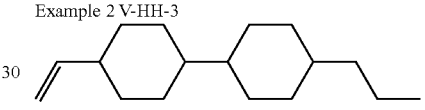

Example 3 2-BBB(2F)-3

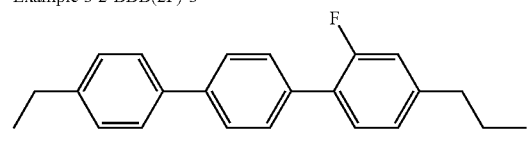

Example 4 VFF-H2H-3

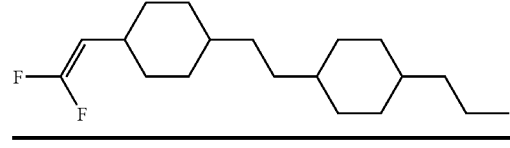

The composition is prepared by first measuring components such as a liquid crystal compound and then by mixing them. Accordingly, the weight percentages of the component compounds can be easily calculated.

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement. Namely: (extrapolated value)={(value measured)−0.85×(value measured for mother liquid crystals)}/0.15. When a smectic phase (or crystals) separated out at this ratio at 25° C., a ratio of the compound and mother liquid crystals was changed step by step in the order of (10% by weight/90% by weight), (5% by weight/95% by weight), (1% by weight/99% by weight), respectively. Values for a maximum temperature, optical anisotropy, viscosity, and dielectric anisotropy of the compound were obtained by the extrapolation.

The composition of the mother liquid crystals is as shown below.

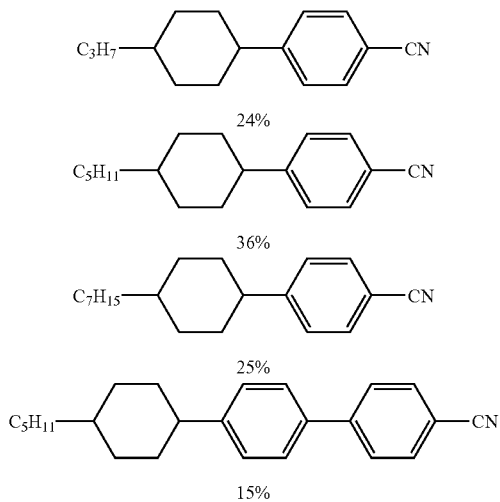

Measurement of the characteristics was carried out according to the following methods. Most methods are described in the Standard of Electric Industries Association of Japan, EIAJ•ED-2521 A or those with some modifications.

Maximum Temperature of a Nematic Phase (NI; ° C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

Minimum Temperature of a Nematic Phase (Tc; ° C.): A sample having a nematic phase was put in a glass vial and then kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals or a smectic phase at −30° C., Tc was expressed as ≦−20° C. A lower limit of a temperature range of a nematic phase may be abbreviated to "a minimum temperature."

Viscosity (η; measured at 20° C., mPa·s): A viscosity was measured by means of an E-type viscometer.

Rotation Viscosity (γ1; measured at 25° C.; mPa·s): Rotation viscosity was measured according to the method disclosed in M. Imai, et al., *Molecular Crystals and Liquid Crytals*, Vol. 259, p. 37 (1995). A sample was placed in a TN device, in which a twist angle was 0°, and a cell gap between two glass plates was 5 μm. The TN device was impressed with a voltage in a range of from 16 V to 19.5 V stepwise by 0.5 V. After a period of 0.2 second with no impress of voltage, voltage impress was repeated with only one rectangular wave (rectangular pulse of, 0.2 second) and application of no voltage (2 seconds). A peak current and a peak time of a transient current generated by the voltage impress were measured. Rotation viscosity was obtained from the measured values and the calculating equation (8) in the literature by M. Imai, et al., p. 40. As the dielectric anisotropy necessary for the calculation, the value measured by the measuring method of dielectric anisotropy described below with the device for measuring the rotation viscosity was used.

Optical Anisotropy (Δn; measured at 25° C.): Measurement was carried out with an Abbe refractometer mounting a polarizing plate on an ocular using a light at a wavelength of 589 nm. The surface of a main prism was rubbed in one direction, and then a sample was dropped on the main prism. Refractive index (n∥) was measured when the direction of a polarized light was parallel to that of the rubbing. Refractive index (n⊥) was measured when the direction of a polarized light was perpendicular to that of the rubbing. A value of optical anisotropy was calculated from the equation: Δn=n∥−n⊥.

Dielectric Anisotropy (Δ∈; measured at 25° C.): A sample having a nematic phase was put in a TN device having a distance between two glass substrates (cell gap) of 9 μm and a twist angle of 80°. Sine waves (10 V, 1 kHz) were impressed onto the device, and a dielectric constant (∈∥) in a major axis direction of a liquid crystal molecule was measured after 2 seconds. Sine waves (0.5 V, 1 kHz) were impressed onto the device, and a dielectric constant (∈⊥) in a minor axis direction of a liquid crystal molecule was measured after 2 seconds. A value of a dielectric anisotropy was calculated from the equation: Δ∈=∈∥−∈⊥.

Threshold Voltage (Vth; measured at 25° C.; V): Measurement was carried out with LCD Evaluation System Model LCD-5100 made by Otsuka Electronics Co., Ltd. The light source was a halogen lamp. A sample was poured into a TN device of a normally white mode, in which a cell gap between two glass plates was about 0.45/Δn (μm), and a twist angle was 80°. Voltage to be impressed onto the device (32 Hz, rectangular waves) was stepwise increased by 0.02 V starting from 0 V up to 10 V. During the stepwise increasing, the device was irradiated with light in a perpendicular direction, and an amount of the light passing through the device was measured. Voltage-transmission curve was prepared, in which a maximum amount of a light corresponded to 100% transmittance, a minimum amount of a light corresponded to 0% transmittance. Threshold voltage is a value at 90% transmittance.

Voltage Holding Ratio (VHR-1; measured at 25° C.; %, VHR-2; measured at 80° C.; %): A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was impressed and charged with pulse voltage (60 microseconds at 5 V). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B.

Voltage Holding Ratio (VHR-3; measured at 25° C.; %): A voltage holding ratio (VHR-3; measured at 25° C.; %) was measured after irradiating with ultraviolet light to evaluate stability to ultraviolet light. A composition having large VHR-3 has a large stability to ultraviolet light. A TN device used for measurement has a polyimide-alignment film and the cell gap is 5 μm. A sample was poured into the device, and then the device was irradiated with light for 20 minutes. The light source was a superhigh voltage mercury lamp USH-500D (produced by Ushio, Inc.), and the distance between the device and the light source is 20 cm. In measurement of VHR-3, a decreasing voltage is measured for 1667 milliseconds.

Response Time (τ; measured at 25° C.; millisecond): Measurement was carried out with LCD Evaluation System Model LCD-5100 made by Otsuka Electronics Co., Ltd.

Light source is a halogen lamp. Low-pass filter was set at 5 kHz. A sample was poured into a TN device of a normally white mode, in which a cell gap between two glass plates was 0.45/Δn (μm), and a twist angle was 80°. Rectangle waves (60 Hz, 5 V, 0.5 seconds) were impressed to the device. During impressing, the device was irradiated with light in a perpendicular direction, and an amount of the light passing through the device was measured. A maximum amount of a light corresponds to 100% transmittance, and a minimum amount of a light corresponds to 0% transmission. Rise time (τr) is a period of time required for the change in transmittance from 90% to 10%. Fall time (τf) is a period of time required for the change in transmittance from 10% to 90%. Response time (τ) is a sum of the rise time and the fall time thus obtained.

Gas Chromatographic Analysis: A Gas Chromatograph Model GC-14B made by Shimadzu was used for measurement. The carrier gas was helium (2 milliliters per minute). An evaporator and a detector (FID) were set up at 280° C. and 300° C., respectively. Capillary column DB-1 (length 30 meters, bore 0.32 millimeters, film thickness 0.25 micrometers, dimethylpolysiloxane as stationary phase, no polarity) made by Agilent Technologies, Inc. was used for the separation of the component compound. After the column had been kept at 200° C. for 2 minutes, it was further heated to 280° C. at the rate of 5° C. per minute. A sample was prepared in an acetone solution (0.1% by weight), and 1 microliter of the solution was injected into the evaporator. The recorder used was Chromatopac Model C-R5A made by Shimadzu or its equivalent. Gas chromatogram obtained showed a retention time of a peak and a peak area corresponding to the component compound.

Solvents for diluting the sample may also be chloroform, hexane, and so forth. The following capillary columns may also be used: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). In order to prevent compound peaks from overlapping, a capillary column CBP1-M50-025 (50 meters, bore 0.25 millimeters, film thickness 0.25 micrometers) made by Shimadzu Corporation may be used.

The ratios of the liquid crystal compounds contained in the composition can also be calculated in the following manner. A liquid crystal compound can be detected by gas chromatography. An area ratio of peaks on a gas chromatogram corresponds to a ratio (molar number) of liquid crystal compounds. In the case where the aforementioned capillary columns are used, correction coefficients of the liquid crystal compounds can be regarded as 1. Accordingly, the ratio (% by weight) of liquid crystal compounds is calculated from the area ratio of peaks.

Comparative Example 1

Example 3 was chosen from the compositions disclosed in JP 2001-3053 A/2001. The basis is that the composition contains a compound having the similar skeleton as the compound (1) of the first component of the invention. The components and characteristics of the composition are as follows. The composition was prepared and measured for characteristics.

| | | |
|---|---|---|
| 3-HBB(F,F)XB(F)-F | (-) | 5% |
| 2-HBB(F,F)XB(F,F)-F | (-) | 10% |
| 3-HBB(F,F)XB(F,F)-F | (-) | 10% |
| 2-BB(F,F)XBB(F)-F | (-) | 5% |
| 3-BB(F,F)XBB(F)-F | (-) | 5% |
| 3-BB(F,F)XB(F,F)B(F)-F | (-) | 3% |
| 2-BBB(F,F)XB(F,F)-F | (-) | 3% |
| 3-BBB(F,F)XB(F,F)-F | (-) | 4% |
| 2-BB(F,F)XB(F,F)-F | (4-1-2) | 12% |
| 3-BB(F,F)XB(F,F)-F | (4-1-2) | 13% |
| 3-HHB(F,F)-F | (-) | 8% |
| 4-HHB(F,F)-F | (-) | 5% |
| 3-H2HB(F,F)-F | (-) | 10% |
| 3-H2BB(F,F)-F | (-) | 7% |

NI=78.7° C.; Tc≦−20° C.; Δn=0.139; Δ∈=16.4; γ1=272 mPa·s; Vth=1.00 V; τ=49.4 ms.

Comparative Example 2

Example M1 was chosen from the compositions disclosed in WO 2005017067 A1. The basis is that the composition contains a compound having the similar skeleton as the compound (1) of the first component of the invention and the compound of the third component of the invention. The components and characteristics of the composition are as follows. The composition was prepared and measured for characteristics.

| | | |
|---|---|---|
| 3-HH-4 | (3-1) | 5% |
| V-HH-5 | (3-2) | 15% |
| 1V-HH-3 | (3-3) | 8% |
| 2-BB(F,F)XB(F,F)-F | (4-1-2) | 3% |
| 2-HB(F)B(F,F)XB(F,F)-F | (-) | 10.5% |
| 3-HBB(F,F)XB(F,F)-F | (-) | 10% |
| 7-HB-F | (5-1) | 5% |
| 1-HHB(F,F)-F | (-) | 7.5% |
| 2-HHB(F,F)-F | (-) | 12% |
| 4-HHB(F,F)-F | (-) | 10% |
| 2-HHB-OCF3 | (-) | 5% |
| 3-HHB-OCF3 | (-) | 8% |
| V-HHB(F)-F | (-) | 1% |

NI=70.5° C.; Tc≦−20° C.; Δn=0.0839; Δ∈=7.8; γ1=79.3 mPa·s; Vth=1.34 V; τ=18.1 ms.

Comparative Example 3

Example M1 was chosen from the compositions disclosed in JP 2004-285353 A2/2004. The basis is that the composition contains a compound having the similar skeleton as the compound (1) of the first component of the invention and the compound of the third component of the invention. The components and characteristics of the composition are as follows. The composition was prepared and measured for characteristics.

| | | |
|---|---|---|
| 3-HH-5 | (3-1) | 5% |
| V-HH-5 | (3-2) | 8% |
| 1V-HH-3 | (3-3) | 12% |
| 2-BB(F)B(F,F)-F | (4-2-1) | 4% |
| 2-HBB(F,F)XB(F,F)-F | (-) | 8% |
| 3-HBB(F,F)XB(F,F)-F | (-) | 3% |
| 1-HHXB(F,F)-F | (-) | 14% |
| 2-HHXB(F,F)-F | (-) | 9% |
| 3-HHXB(F,F)-F | (-) | 9% |

-continued

| | | |
|---|---|---|
| 5-HHXB(F,F)-F | (-) | 4% |
| 1-HHB(F,F)-F | (-) | 2% |
| 3-HHB-OCF3 | (-) | 5% |
| 2-HGB(F,F)-F | (-) | 8% |
| 3-HGB(F,F)-F | (-) | 9% |

NI=72.3° C.; Tc≦−20° C.; Δn=0.0785; Δ∈=9.3; γ1=86.9 mPa·s; Vth=1.23 V; τ=20.4 ms.

Comparative Example 4

Example 1 was chosen from the compositions disclosed in WO 2005007775 A1. The basis is that the composition contains compounds of the second component and the third component of the invention. The components and characteristics of the composition are as follows. The composition was prepared and measured for characteristics.

| | | |
|---|---|---|
| 2-BB(F)B-3 | (2-1-1) | 5% |
| V-HHB-1 | (2-3-1) | 12% |
| V-HH-4 | (3-2) | 18% |
| 1V-HH-3 | (3-3) | 10% |
| 2-BB(F,F)XB(F,F)-F | (4-1-2) | 6% |
| 3-BB(F,F)XB(F,F)-F | (4-1-2) | 8% |
| 2-HHB-OCF3 | (-) | 2% |
| 3-HHB-OCF3 | (-) | 8% |
| 3-HHEB(F,F)-F | (-) | 14% |
| 3-HB-O1 | (5-1) | 7% |
| V-HHB(F)-F | (-) | 10% |

NI=79.8° C.; Tc≦−20° C.; Δn=0.091; Δ∈=4.7; γ1=58.0 mPa·s; Vth=1.76 V; τ=11.7 ms.

Example 1

| | | |
|---|---|---|
| 3-BB(F)B(F,F)XB(F,F)-F | (1-8) | 7% |
| 2-BB(F)B-3 | (2-1-1) | 10% |
| 2-BB(F)B-5 | (2-1-1) | 14% |
| 3-BB(F)B-5 | (2-1-1) | 15% |
| 3-HBB-F | (2-2-2) | 4% |
| V-HH-3 | (3-2) | 31% |
| 3-BB(F,F)XB(F,F)-F | (4-1-2) | 9% |
| 1V2-BB-F | (5-2) | 8% |
| 5-HBB(F)B-2 | (-) | 2% |

NI=80.0° C.; Tc≦−20° C.; Δn=0.160; Δ∈=3.7; γ1=58.3 mPa·s; Vth=2.48 V; VHR-1=99.0%; VHR-2=98.0%; τ=14.4 ms.

The composition of Example 1 had a high maximum temperature, a large refractive index anisotropy, a small rotation viscosity and a short response time, as compared to the composition of Comparative Example 1.

Example 2

| | | |
|---|---|---|
| 3-BB(F)B(F,F)XB(F,F)-F | (1-8) | 10% |
| 2-BB(F)B-3 | (2-1-1) | 10.5% |
| V-HHB-1 | (2-3-1) | 9.5% |
| V-HH-3 | (3-2) | 39% |
| 1V-HH-3 | (3-3) | 13% |
| 3-BB(F,F)XB(F,F)-F | (4-1-2) | 10% |

-continued

| | | |
|---|---|---|
| 3-HBB(F,F)-F | (-) | 6% |
| 5-HBB(F)B-2 | (-) | 2% |

NI=74.6° C.; Tc≦−20° C.; Δn=0.108; Δ∈=4.4; γ1=42.0 mPa·s; Vth=1.98 V; VHR-1=99.1%; VHR-2=98.1%; τ=8.3 ms.

The composition of Example 2 had a high maximum temperature, a large refractive index anisotropy, a small rotation viscosity and a short response time, as compared to the compositions of Comparative Examples 2 and 3.

Example 3

| | | |
|---|---|---|
| 3-BB(F)B(F,F)XB(F,F)-F | (1-8) | 7% |
| 5-BB(F)B(F,F)XB(F,F)-F | (1-8) | 7% |
| 2-BB(F)B-3 | (2-1-1) | 5% |
| V-HH-3 | (3-2) | 12% |
| V-HH-4 | (3-2) | 18% |
| 1V-HH-3 | (3-3) | 10% |
| 3-HB-O1 | (5-1) | 7% |
| 2-HHB-OCF3 | (-) | 2% |
| 3-HHB-OCF3 | (-) | 8% |
| 3-HHEB(F,F)-F | (-) | 14% |
| V-HHB(F)-F | (-) | 10% |

NI=79.9° C.; Tc≦−20° C.; Δn=0.091; Δ∈=4.7; γ1=47.0 mPa·s; Vth=1.72 V; VHR-1=98.9%; VHR-2=98.0%; τ=9.3 ms.

The composition of Example 3 had an equivalent maximum temperature, an equivalent threshold voltage, a small rotation viscosity and a short response time, as compared to the composition of Comparative Example 4.

Example 4

| | | |
|---|---|---|
| 3-BB(F)B(F,F)XB(F,F)-F | (1-8) | 5% |
| 5-BB(F)B(F,F)XB(F,F)-F | (1-8) | 5% |
| 2-BB(F)B-3 | (2-1-1) | 10.5% |
| V-HHB-1 | (2-3-1) | 5.5% |
| V2-HHB-1 | (2-3-1) | 4% |
| V-HH-3 | (3-2) | 30% |
| V-HH-V1 | (3-2) | 22% |
| 3-BB(F,F)XB(F)-OCF3 | (4-1-3) | 5% |
| 5-BB(F,F)XB(F)-OCF3 | (4-1-3) | 5% |
| 3-HBB(F,F)-F | (-) | 6% |
| 5-HBB(F)B-2 | (-) | 2% |

NI=74.9° C.; Tc≦−20° C.; Δn=0.113; Δ∈=4.0; γ1=37.8 mPa·s; Vth=2.08 V; VHR-1=99.0%; VHR-2=98.1%; τ=6.2 ms.

Example 5

| | | |
|---|---|---|
| 2-BB(F)B(F,F)XB(F,F)-F | (1-8) | 8% |
| 3-BB(F)B(F,F)XB(F,F)-F | (1-8) | 7% |
| 5-BB(F)B(F,F)XB(F,F)-F | (1-8) | 7% |
| 2-BB(F)B-3 | (2-1-1) | 8% |
| 2-BBB(2F)-3 | (2-1-2) | 5% |
| 1V2-HBB-2 | (2-2-1) | 5% |
| 2-HBB-F | (2-2-2) | 5% |

-continued

| | | |
|---|---|---|
| 3-HBB-F | (2-2-2) | 5% |
| 5-HBB-F | (2-2-2) | 5% |
| V-HHB-1 | (2-3-1) | 5% |
| 2-HH-3 | (3-1) | 5% |
| 3-HH-4 | (3-1) | 5% |
| V-HH-3 | (3-2) | 20% |
| 1V-HH-3 | (3-3) | 6% |
| 3-HB-CL | (5-1) | 4% |

NI=89.1° C.; Tc≦−10° C.; Δn=0.137; Δ∈=6.4; γ1=98.0 mPa·s; Vth=1.72 V; VHR-1=98.8%; VHR-2=98.2%; τ=17.3 ms.

Example 6

| | | |
|---|---|---|
| 3-BB(F)B(F,F)XB(F,F)-F | (1-8) | 5% |
| 5-BB(F)B(F,F)XB(F,F)-F | (1-8) | 5% |
| V2-HBB-2 | (2-2-1) | 10% |
| 1 V2-HBB-2 | (2-2-1) | 5% |
| 2-HBB-F | (2-2-2) | 7% |
| 3-HBB-F | (2-2-2) | 7% |
| 5-HBB-F | (2-2-2) | 7% |
| V-HH-3 | (3-2) | 15% |
| V-HH-4 | (3-2) | 5% |
| V-HH-5 | (3-2) | 5% |
| VFF-HH-3 | (3-8) | 10% |
| 3-BB(F,F)XB(F,F)-F | (4-1-2) | 5% |
| 7-HB-1 | (5-1) | 4% |
| 3-HHXB(F,F)-F | (—) | 10% |

NI=83.2° C.; Tc≦−20° C.; Δn=0.113; Δ∈=5.2; γ1=68.4 mPa·s; Vth=1.88 V; VHR-1=98.8%; VHR-2=98.2%; τ=12.8 ms.

Example 7

| | | |
|---|---|---|
| 2-BB(F)B(F,F)XB(F,F)-F | (1-8) | 5% |
| 3-BB(F)B(F,F)XB(F,F)-F | (1-8) | 5% |
| 4-BB(F)B(F,F)XB(F,F)-F | (1-8) | 5% |
| 3-HHB-1 | (2-3-1) | 5% |
| 3-HHB-O1 | (2-3-1) | 5% |
| V-HHB-1 | (2-3-1) | 10% |
| V2-HHB-1 | (2-3-1) | 5% |
| VFF-HHB-1 | (2-3-1) | 5% |
| 3-HHB-F | (2-3-2) | 5% |
| 3-HHB-CL | (2-3-3) | 5% |
| 5-HHB-CL | (2-3-3) | 5% |
| 3-HH-O1 | (3-1) | 10% |
| V-HH-3 | (3-2) | 20% |
| 3-HB-CL | (5-1) | 10% |

NI=96.0° C.; Tc≦−20° C.; Δn=0.105; Δ∈=4.0; γ1=83.0 mPa·s; Vth=2.23 V; VHR-1=98.7%; VHR-2=98.2%; τ=17.7 ms.

Example 8

| | | |
|---|---|---|
| 3-BB(F)B(F,F)XB(F,F)-F | (1-8) | 6% |
| 1 V2-BB(F)B(F,F)XB(F,F)-F | (1-8) | 6% |
| 2-BB(F)B-3 | (2-1-1) | 10% |
| 2-BB(F)B-5 | (2-1-1) | 10% |
| 3-BB(F)B-5 | (2-1-1) | 5% |
| 2-BBB(2F)-3 | (2-1-2) | 5% |
| 2-BBB(2F)-5 | (2-1-2) | 5% |
| 2-BB(2F,5F)B-2 | (2-1-3) | 5% |
| 3-BB(2F,5F)B-3 | (2-1-3) | 5% |
| 3-HH-O1 | (3-1) | 10% |
| V-HH-3 | (3-2) | 25% |
| VFF-HH-3 | (3-8) | 8% |

NI=77.6° C.; Tc≦−20° C.; Δn=0.150; Δ∈=3.7; γ1=78.0 mPa·s; Vth=2.31 V; VHR-1=98.9%; VHR-2=98.2%; τ=17.8 ms.

Example 9

| | | |
|---|---|---|
| 3-BB(F)B(F,F)XB(F,F)-OCF3 | (1-16) | 6% |
| 5-BB(F)B(F,F)XB(F,F)-OCF3 | (1-16) | 6% |
| 2-BB(F)B-3 | (2-1-1) | 5% |
| 2-BB(F)B-5 | (2-1-1) | 5% |
| 3-BB(F)B-5 | (2-1-1) | 5% |
| 2-HBB-F | (2-2-2) | 5% |
| 3-HBB-F | (2-2-2) | 5% |
| 5-HBB-F | (2-2-2) | 5% |
| V-HHB-1 | (2-3-1) | 7% |
| 2-HH-3 | (3-1) | 8% |
| V-HH-3 | (3-2) | 25% |
| V-HH-V 1 | (3-2) | 8% |
| 2-B(F)B(F)B(F,F)-F | (4-2-2) | 5% |
| 3-B(F)B(F)B(F,F)-F | (4-2-2) | 5% |

NI=78.1° C.; Tc≦−20° C.; Δn=0.131; Δ∈=5.5; γ1=64.7 mPa·s; Vth=1.80 V; VHR-1=98.9%; VHR-2=98.2%; τ=11.9 ms.

Example 10

| | | |
|---|---|---|
| 3-BB(F)B(F,F)XB(F,F)-OCF3 | (1-16) | 5% |
| 5-BB(F)B(F,F)XB(F,F)-OCF3 | (1-16) | 5% |
| 2-BB(F)B-3 | (2-1-1) | 6% |
| 2-BB(F)B-5 | (2-1-1) | 6% |
| 3-BB(F)B-5 | (2-1-1) | 6% |
| V-HH-3 | (3-2) | 25% |
| V-HH-5 | (3-2) | 10% |
| 2-BB(F)B(F,F)-F | (4-2-1) | 5% |
| 3-BB(F)B(F,F)-F | (4-2-1) | 5% |
| 2-B(F)B(F)B(F,F)-F | (4-2-2) | 4% |
| 3-B(F)B(F)B(F,F)-F | (4-2-2) | 4% |
| 1 V2-BB-1 | (5-2) | 7% |
| 5-HBB(F)B-2 | (—) | 6% |
| 5-HBB(F)B-3 | (—) | 6% |

NI=85.2° C.; Tc≦−20° C.; Δn=0.159; Δ∈=6.5; γ1=100.1 mPa·s; Vth=1.69 V; VHR-1=99.0%; VHR-2=98.2%; τ=18.3 ms.

Example 11

| | | |
|---|---|---|
| 3-B(F)B(F)B(F,F)XB(F,F)-F | (1-3) | 5% |
| 3-BB(F)B(F,F)XB(F)-F | (1-5) | 5% |
| 5-BB(F)B(F,F)XB(F)-F | (1-5) | 5% |
| 2-BB(F)B-3 | (2-1-1) | 5% |
| 2-BB(F)B-5 | (2-1-1) | 5% |
| 2-BB(2F, 5F)B-2 | (2-1-3) | 5% |

-continued

| | | |
|---|---|---|
| V-HHB-1 | (2-3-1) | 12% |
| VFF-HHB-1 | (2-3-1) | 5% |
| 3-HHB-CL | (2-3-3) | 5% |
| 5-HHB-CL | (2-3-3) | 5% |
| 2-HH-3 | (3-1) | 5% |
| VFF-HH-3 | (3-8) | 16% |
| VFF-HH-5 | (3-8) | 8% |
| 3-BB(F,F)XB(F)-F | (4-1-1) | 5% |
| 3-BB(F,F)XB(F)-OCF3 | (4-1-3) | 4% |
| 3-BB(F,F)XB(F,F)-OCF3 | (4-1-4) | 5% |

NI=86.6° C.; Tc≦−20° C.; Δn=0.134; Δ∈=7.3; γ1=119.0 mPa·s; Vth=1.60 V; VHR-1=98.9%; VHR-2=98.1%; τ=20.0 ms.

Example 12

| | | |
|---|---|---|
| 3-BB(F)B(F,F)XB(F,F)-OCHF2 | (1-24) | 6% |
| 5-BB(F)B(F,F)XB(F,F)-OCHF2 | (1-24) | 6% |
| 3-HBB-2 | (2-2-1) | 10% |
| 5-HBB-2 | (2-2-1) | 5% |
| 2-HBB-F | (2-2-2) | 5% |
| 3-HBB-F | (2-2-2) | 5% |
| 5-HBB-F | (2-2-2) | 5% |
| V-HH-3 | (3-2) | 25% |
| V-HH-5 | (3-2) | 5% |
| V-HH-V 1 | (3-2) | 10% |
| 3-BB(F,F)XB(F,F)-F | (4-1-2) | 10% |
| 3-BB(F,F)XB(F)-OCF3 | (4-1-3) | 8% |

NI=74.4° C.; Tc≦−20° C.; Δn=0.115; Δ∈=6.9; γ1=69.7 mPa·s; Vth=1.59 V; τ=12.0 ms.

Example 13

| | | |
|---|---|---|
| 2-BB(F)B(F,F)XB(F,F)-OCHF2 | (1-24) | 4% |
| 3-BB(F)B(F,F)XB(F,F)-OCHF2 | (1-24) | 4% |
| 4-BB(F)B(F,F)XB(F,F)-OCHF2 | (1-24) | 4% |
| 5-BB(F)B(F,F)XB(F,F)-OCHF2 | (1-24) | 4% |
| 2-BB(F)B-3 | (2-1-1) | 5% |
| 2-BB(F)B-5 | (2-1-1) | 5% |
| 3-BB(F)B-5 | (2-1-1) | 4% |
| 3-HBB-2 | (2-2-1) | 10% |
| V2-HBB-2 | (2-2-1) | 10% |
| 1 V2-HBB-2 | (2-2-1) | 5% |
| 2-HBB-F | (2-2-2) | 5% |
| 3-HBB-F | (2-2-2) | 5% |
| 5-HBB-F | (2-2-2) | 5% |
| V-HH-3 | (3-2) | 20% |
| 3-HB-O2 | (5-1) | 10% |

NI=99.4° C.; Tc≦−20° C.; Δn=0.152; Δ∈=5.1; γ1=102.0 mPa·s; Vth=1.99 V; τ=19.0 ms.

Example 14

| | | |
|---|---|---|
| 2-BB(F)B(F,F)XB(F,F)-F | (1-8) | 4% |
| 3-BB(F)B(F,F)XB(F,F)-F | (1-8) | 4% |
| 2-BB(F)B(F,F)XB(F,F)-OCF3 | (1-16) | 4% |
| 3-BB(F)B(F,F)XB(F,F)-OCF3 | (1-16) | 4% |
| 3-HBB-2 | (2-2-1) | 5% |
| V2-HBB-2 | (2-2-1) | 5% |

-continued

| | | |
|---|---|---|
| 2-HBB-F | (2-2-2) | 5% |
| 3-HBB-F | (2-2-2) | 5% |
| 5-HBB-F | (2-2-2) | 5% |
| V-HHB-1 | (2-3-1) | 10% |
| 3-HHB-CL | (2-3-3) | 4% |
| 5-HHB-CL | (2-3-3) | 4% |
| V-HH-3 | (3-2) | 25% |
| 1 V-HH-3 | (3-3) | 12% |
| 1 V2-BB-1 | (5-2) | 4% |

NI=99.9° C.; Tc≦−20° C.; Δn=0.123; Δ∈=4.3; γ1=70.0 mPa·s; Vth=2.15 V; τ=14.0 ms.

Example 15

| | | |
|---|---|---|
| 3-B(F)B(F)B(F,F)XB(F,F)-F | (1-3) | 4% |
| 5-B(F)B(F)B(F,F)XB(F,F)-F | (1-3) | 4% |
| 3-BB(F)B(F,F)XB(F)-F | (1-5) | 4% |
| 5-BB(F)B(F,F)XB(F)-F | (1-5) | 4% |
| 2-BB(F)B-3 | (2-1-1) | 10% |
| 2-BB(2F,5F)B-2 | (2-1-3) | 5% |
| 2-BB(2F,5F)B-3 | (2-1-3) | 5% |
| V-HHB-1 | (2-3-1) | 10% |
| 3-HH-O1 | (3-1) | 20% |
| V-HH-3 | (3-2) | 18% |
| V-HH-5 | (3-2) | 4% |
| 5-HB(F)BH-3 | (—) | 4% |
| 1O1-HBBH-3 | (—) | 4% |
| 1O1-HBBH-4 | (—) | 4% |

NI=93.7° C.; Tc≦−20° C.; Δn=0.129; Δ∈=3.7; γ1=121.0 mPa·s; Vth=2.36V; τ=27.1 ms.

Example 16

| | | |
|---|---|---|
| 2-BB(F)B(F,F)XB(F,F)-F | (1-8) | 5% |
| 3-BB(F)B(F,F)XB(F,F)-F | (1-8) | 5% |
| 2-BB(F)B-3 | (2-1-1) | 5% |
| 2-BB(F)B-5 | (2-1-1) | 5% |
| 3-BB(F)B-5 | (2-1-1) | 5% |
| 2-HBB-F | (2-2-2) | 5% |
| 3-HBB-F | (2-2-2) | 5% |
| 5-HBB-F | (2-2-2) | 5% |
| V-HHB-1 | (2-3-1) | 10% |
| V-HH-3 | (3-2) | 20% |
| 3-BB(F,F)XB(F,F)-F | (4-1-2) | 12% |
| 3-BB(F,F)XB(F)-OCF3 | (4-1-3) | 6% |
| 3-HHEB(F,F)-F | (—) | 4% |
| 3-HGB(F,F)-F | (—) | 4% |
| 3-GHB(F,F)-F | (—) | 4% |

NI=77.5° C.; Tc≦−20° C.; Δn=0.132; Δ∈=8.8; γ1=142.0 mPa·s; Vth=1.42 V; τ=22.9 ms.

Example 17

| | | |
|---|---|---|
| 3-BB(F)B(F,F)XB(F,F)-F | (1-8) | 5% |
| 3-BB(F)B(F,F)XB(F,F)-OCF3 | (1-16) | 5% |
| 3-BB(F)B(F,F)XB(F,F)-OCHF2 | (1-24) | 5% |
| 3-HBB-2 | (2-2-1) | 5% |
| V2-HBB-2 | (2-2-1) | 5% |
| 1 V2-HBB-2 | (2-2-1) | 3% |

-continued

| | | |
|---|---|---|
| 3-HHB-F | (2-3-2) | 5% |
| 3-HHB-CL | (2-3-3) | 5% |
| 5-HHB-CL | (2-3-3) | 5% |
| V-HH-3 | (3-2) | 20% |
| V-HH-5 | (3-2) | 5% |
| V-HH-V 1 | (3-2) | 10% |
| 3-BB(F)B(F,F)-F | (4-2-1) | 10% |
| 3-HHB(F)-F | (—) | 4% |
| 3-HBB(F)-F | (—) | 4% |
| 3-H2BB(F)-F | (—) | 4% |

NI=92.8° C.; Tc≦−20° C.; Δn=0.127; Δ∈=6.3; γ1=87.6 mPa·s; Vth=1.77 V; τ=17.0 ms.

Example 18

| | | |
|---|---|---|
| 3-BB(F)B(F,F)XB(F,F)-F | (1-8) | 6% |
| 5-BB(F)B(F,F)XB(F,F)-F | (1-8) | 6% |
| 2-BB(F)B-3 | (2-1-1) | 5% |
| 2-HBB-F | (2-2-2) | 5% |
| 3-HBB-F | (2-2-2) | 5% |
| 5-HBB-F | (2-2-2) | 5% |
| V-HH-3 | (3-2) | 25% |
| VFF-HH-3 | (3-8) | 5% |
| VFF-HH-5 | (3-8) | 5% |
| 3-BB(F)B(F,F)-F | (4-2-1) | 10% |
| 3-B(F)B(F)B(F,F)-F | (4-2-2) | 8% |
| 3-HHB(F,F)-F | (—) | 5% |
| 3-HHBB(F,F)-F | (—) | 5% |
| 3-HBB(F,F)-F | (—) | 5% |

NI=73.0° C.; Tc≦−20° C.; Δn=0.130; Δ∈=8.5; γ1=117.1 mPa·s; Vth=1.42 V; VHR-1=99.0%; VHR-2=98.0%; τ=18.9 ms.

Example 19

| | | |
|---|---|---|
| 3-BB(F)B(F,F)XB(F,F)-F | (1-8) | 7% |
| 3-BB(F)B(F,F)XB(F,F)-OCF3 | (1-16) | 7% |
| 2-BB(F)B-3 | (2-1-1) | 5% |
| 2-BB(F)B-5 | (2-1-1) | 5% |
| 3-HHB-1 | (2-3-1) | 6% |
| 3-HHB-CL | (2-3-3) | 5% |
| 5-HHB-CL | (2-3-3) | 5% |
| 2-HH-3 | (3-1) | 5% |
| V-HH-3 | (3-2) | 30% |
| 3-BB(F,F)XB(F,F)-F | (4-1-2) | 10% |
| 3-BB(F)B(F,F)-F | (4-2-1) | 10% |
| 3-B(F)B(F)B(F,F)-F | (4-2-2) | 5% |

NI=72.9° C.; Tc≦−20° C.; Δn=0.129; Δ∈=9.0; γ1=110.0 mPa·s; Vth=1.38V; τ=17.8 ms.

Example 20

| | | |
|---|---|---|
| 3-BB(F)B(F,F)XB(F,F)-F | (1–8) | 5% |
| 5-BB(F)B(F,F)XB(F,F)-F | (1–8) | 5% |
| 2-BB(F)B-3 | (2-1-1) | 5% |
| 2-BB(F)B-5 | (2-1-1) | 5% |
| 1 V2-BB(F)B-3 | (2-1-1) | 5% |
| 3-HBB-2 | (2-2-1) | 5% |
| 2-HBB-F | (2-2-2) | 5% |

-continued

| | | |
|---|---|---|
| 3-HBB-F | (2-2-2) | 5% |
| 5-HBB-F | (2-2-2) | 5% |
| V-HHB-1 | (2-3-1) | 10% |
| V-HH-3 | (3–2) | 30% |
| V-HH-5 | (3-2) | 5% |
| 3-HB(F)B(F,F)XB(F,F)-F | (—) | 10% |

NI=94.2° C.; Tc≦−20° C.; Δn=0.132; Δ∈=5.2; γ1=88.0 mPa·s; Vth=1.96 V; τ=16.5 ms.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A liquid crystal composition having a nematic phase comprising three components, wherein the first component is at least one compound selected from the group of compounds represented by Formula (1), the second component is at least one compound selected from the group of compounds represented by Formulas (2-1) to (2-3), and the third component is at least one compound selected from the group of compounds represented by Formula (3):

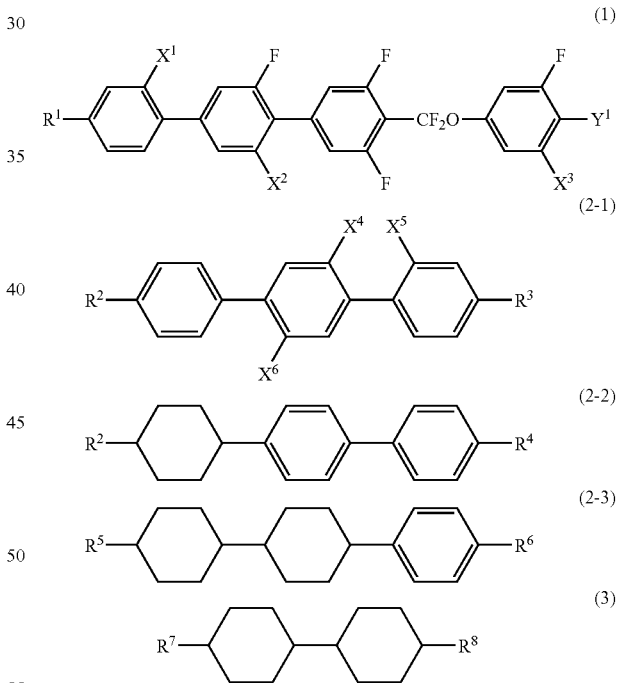

wherein $R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which are replaced by fluorine; $R^2$, $R^3$ and $R^5$ are each independently alkyl having 1 to 12 carbons, alkenyl having 2 to 12 carbons or alkenyl having 2 to 12 carbons, arbitrary hydrogen of which are replaced by fluorine; $R^4$ is fluorine, alkyl having 1 to 12 carbons or alkenyl having 2 to 12 carbons; $R^6$ is fluorine, chlorine, alkyl having 1 to 12 carbons, alkoxy having 1 to 12 carbons or alkenyl having 2 to 12 carbons; $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which are replaced by fluorine; $Y^1$ is fluorine, —$OCF_3$ or —$OCHF_2$; and $X^1, X^2, X^3, X^4, X^5$ and $X^6$ are each independently hydrogen or fluorine, provided that at least one of $X^4, X^5$ and $X^6$ is fluorine.

2. The liquid crystal composition according to claim 1, wherein in Formula (1), $Y^1$ is fluorine, $X^1$ and $X^2$ are hydrogen, and $X^3$ is fluorine; in Formulas (2-1) to (2-3), $X^4$ is fluorine, and $X^5$ and $X^6$ are hydrogen, and in Formula (3), $R^7$ is alkenyl having 2 to 12 carbons or alkenyl having 2 to 12 carbons, arbitrary hydrogen of which is replaced by fluorine, and $R^8$ is alkyl having 1 to 12 carbons.

3. The liquid crystal composition according to claim 1, wherein the second component is at least one compound selected from the group of compounds represented by Formula (2-1).

4. The liquid crystal composition according to claim 2, wherein the second component is at least one compound selected from the group of compounds represented by Formula (2-1).

5. The liquid crystal composition according to claim 1, wherein the ratio of the first component is from approximately 5% by weight to approximately 25% by weight, the ratio of the second component is from approximately 15% by weight to approximately 50% by weight, and the ratio of the third component is from approximately 25% by weight to approximately 50% by weight, based on the total weight of the liquid crystal composition.

6. A liquid crystal composition having a nematic phase comprising four components, wherein the first component is at least one compound selected from the group of compounds represented by Formula (1), the second component is at least one compound selected from the group of compounds represented by Formulas (2-1) to (2-3), the third component is at least one compound selected from the group of compounds represented by Formula (3), and the fourth component is at least one compound selected from the group of compounds represented by Formulas (4-1) and (4-2):

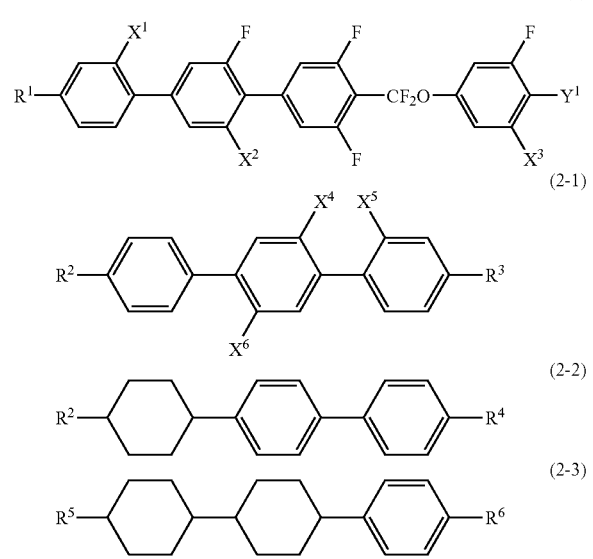

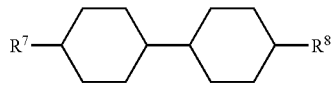

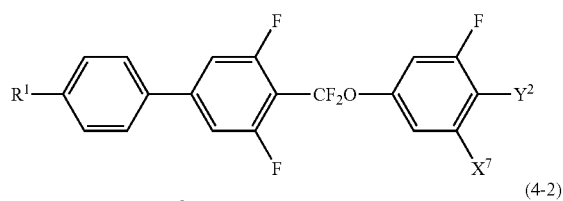

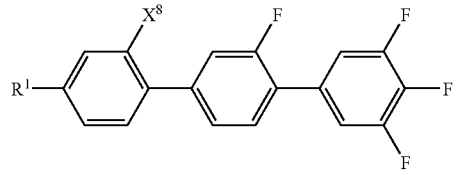

wherein $R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which are replaced by fluorine; $R^2, R^3$ and $R^5$ are each independently alkyl having 1 to 12 carbons, alkenyl having 2 to 12 carbons or alkenyl having 2 to 12 carbons, arbitrary hydrogen of which are replaced by fluorine; $R^4$ is fluorine, alkyl having 1 to 12 carbons or alkenyl having 2 to 12 carbons; $R^6$ is fluorine, chlorine, alkyl having 1 to 12 carbons, alkoxy having 1 to 12 carbons or alkenyl having 2 to 12 carbons; $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which are replaced by fluorine; $Y^1$ is fluorine, —$OCF_3$ or —$OCHF_2$; $Y^2$ is fluorine or —$OCF_3$; and $X^1, X^2, X^3, X^4, X^5, X^6, X^7$ and $X^8$ are each independently hydrogen or fluorine, provided that at least one of $X^4, X^5$ and $X^6$ is fluorine.

7. The liquid crystal composition according to claim 6, wherein in Formula (1), $Y^1$ is fluorine, $X^1$ and $X^2$ are hydrogen, and $X^3$ is fluorine; in Formulas (2-1) to (2-3), $X^4$ is fluorine, and $X^5$ and $X^6$ are hydrogen, and in Formula (3), $R^7$ is alkenyl having 2 to 12 carbons or alkenyl having 2 to 12 carbons, arbitrary hydrogen of which is replaced by fluorine, and $R^8$ is alkyl having 1 to 12 carbons.

8. The liquid crystal composition according to claim 6, wherein the second component is at least one compound selected from the group of compounds represented by Formula (2-1).

9. The liquid crystal composition according to claim 7, wherein the second component is at least one compound selected from the group of compounds represented by Formula (2-1).

10. The liquid crystal composition according to claim 6, wherein the ratio of the first component is from approximately 5% by weight to approximately 25% by weight, the ratio of the second component is from approximately 15% by weight to approximately 50% by weight, the ratio of the third component is from approximately 25% by weight to approximately 50% by weight, and the ratio of the fourth component is from approximately 5% by weight to approximately 20% by weight, based on the total weight of the liquid crystal composition.

11. A liquid crystal composition having a nematic phase comprising three components, wherein the first component is at least one compound selected from the group of compounds, represented by Formula (1), the second component is at least one compound selected from the group of compounds represented by Formulas (2-1) to (2-3), and the third component is at least one compound selected from the group of compounds represented by Formula (3), and the liquid crystal composition is essentially consisting only of the first component, the second component and the third component:

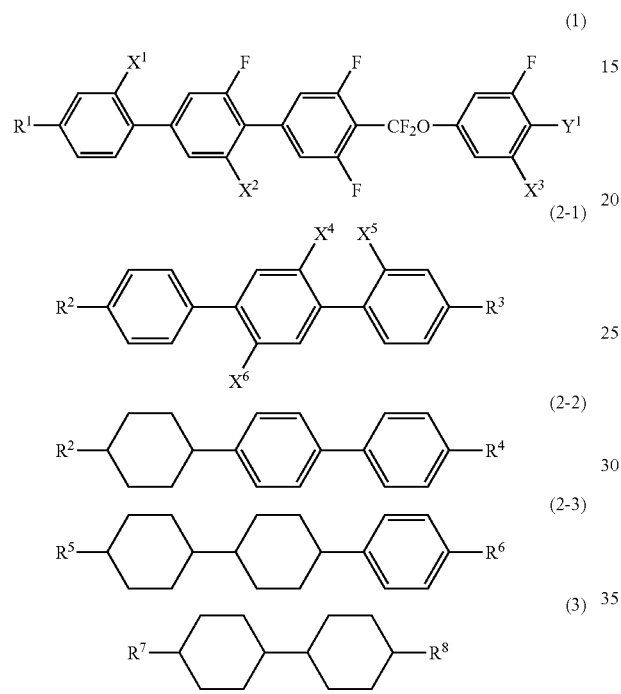

wherein $R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which are replaced by fluorine; $R^2$, $R^3$ and $R^5$ are each independently alkyl having 1 to 12 carbons, alkenyl having 2 to 12 carbons or alkenyl having 2 to 12 carbons, arbitrary hydrogen of which are replaced by fluorine; $R^4$ is fluorine, alkyl having 1 to 12 carbons or alkenyl having 2 to 12 carbons; $R^6$ is fluorine, chlorine, alkyl having 1 to 12 carbons, alkoxy having 1 to 12 carbons or alkenyl having 2 to 12 carbons; $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which are replaced by fluorine; $Y^1$ is fluorine, —$OCF_3$ or —$OCHF_2$; and $X^1$, $X^2$, $X^3$, $X^4$, $X^5$ and $X^6$ are each independently hydrogen or fluorine, provided that at least one of $X^4$, $X^5$ and $X^6$ is fluorine.

12. A liquid crystal composition having a nematic phase comprising four components, wherein the first component is at least one compound selected from the group of compounds represented by Formula (1), the second component is at least one compound selected from the group of compounds represented by Formulas (2-1) to (2-3), the third component is at least one compound selected from the group of compounds represented by Formula (3), and the fifth component is at least one compound selected from the group of compounds represented by Formula (5), and the liquid crystal composition consists essentially of the first component, the second component, the third component and the fifth component:

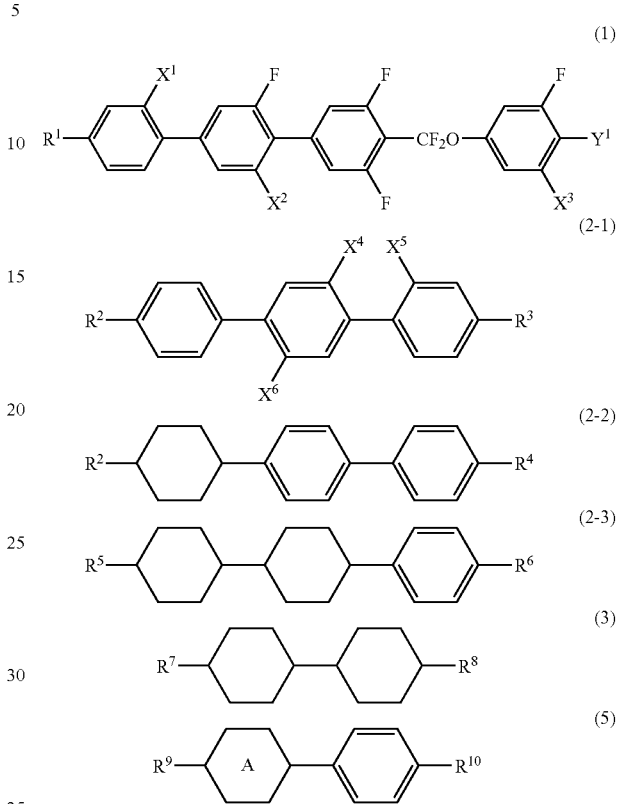

wherein $R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which are replaced by fluorine; $R^2$, $R^3$ and $R^5$ are each independently alkyl having 1 to 12 carbons, alkenyl having 2 to 12 carbons or alkenyl having 2 to 12 carbons, arbitrary hydrogen of which are replaced by fluorine; $R^4$ is fluorine, alkyl having 1 to 12 carbons or alkenyl having 2 to 12 carbons; $R^6$ is fluorine, chlorine, alkyl having 1 to 12 carbons, alkoxy having 1 to 12 carbons or alkenyl having 2 to 12 carbons; $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which are replaced by fluorine; $R^9$ is independently alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which are replaced by fluorine; $R^{10}$ is independently alkyl having 1 to 12 carbons, alkoxy having 1 to 12 carbons, alkoxyalkyl having 2 to 12 carbons, alkenyl having 2 to 12 carbons, alkenyl having 2 to 12 carbons, arbitrary hydrogen of which are replaced by fluorine, fluorine or chlorine; ring A is cyclohexylene or phenylene; $Y^1$ is fluorine, —$OCF_3$ or —$OCHF_2$; and $X^1$, $X^2$, $X^3$, $X^4$, $X^5$ and $X^6$ are each independently hydrogen or fluorine, provided that at least one of $X^4$, $X^5$ and $X^6$ is fluorine.

13. A liquid crystal composition having a nematic phase comprising four components, wherein the first component is at least one compound selected from the group of compounds represented by Formula (1), the second component is at least one compound selected from the group of compounds represented by Formulas (2-1) to (2-3), the third component is at least one compound selected from the group of compounds represented by Formula (3), and the fourth component is at least one compound selected from the group of compounds represented by Formulas (4-1) and (4-2), and the liquid crystal composition consists essentially of the first component, the second component, the third component and the fourth component:

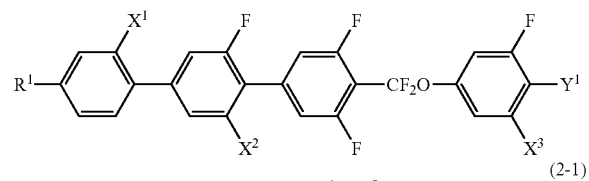
(1)

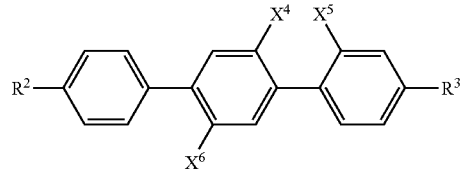
(2-1)

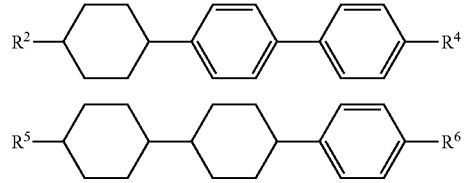
(2-2)

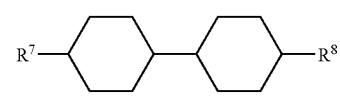
(2-3)

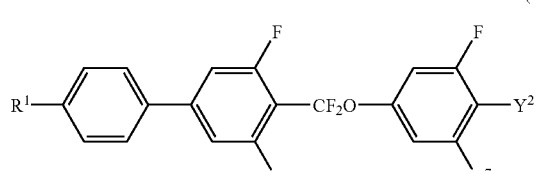
(3)

(4-1)

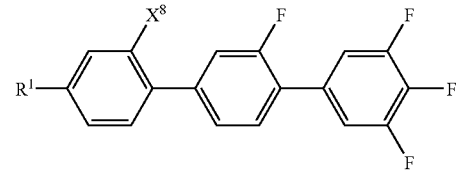
(4-2)

wherein $R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which are replaced by fluorine; $R^2$, $R^3$ and $R^5$ are each independently alkyl having 1 to 12 carbons, alkenyl having 2 to 12 carbons or alkenyl having 2 to 12 carbons, arbitrary hydrogen of which are replaced by fluorine; $R^4$ is fluorine, alkyl having 1 to 12 carbons or alkenyl having 2 to 12 carbons; $R^6$ is fluorine, chlorine, alkyl having 1 to 12 carbons, alkoxy having 1 to 12 carbons or alkenyl having 2 to 12 carbons; $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which are replaced by fluorine; $Y^1$ is fluorine, —OCF$_3$ or —OCHF$_2$; $Y^2$ is fluorine or —OCF$_3$; and $X^1$, $X^2$, $X^3$, $X^4$, $X^5$, $X^6$, $X^7$ and $X^8$ are each independently hydrogen or fluorine, provided that at least one of $X^4$, $X^5$ and $X^6$ is fluorine.

14. A liquid crystal composition having a nematic phase comprising five components, wherein the first component is at least one compound selected from the group of compounds represented by Formula (1), the second component is at least one compound selected from the group of compounds represented by Formulas (2-1) to (2-3), the third component is at least one compound selected from the group of compounds represented by Formula (3), the fourth component is at least one compound selected from the group of compounds represented by Formulas (4-1) and (4-2), and the fifth component is at least one compound selected from the group of compounds represented by Formula (5), and the liquid crystal composition consists essentially of the first component, the second component, the third component, the fourth component and the fifth component:

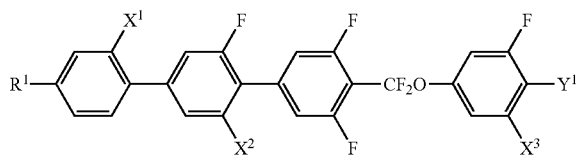
(1)

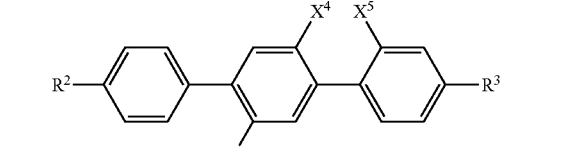
(2-1)

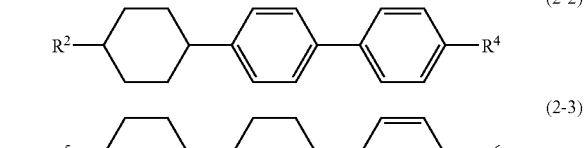
(2-2)

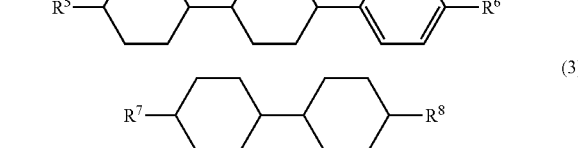
(2-3)

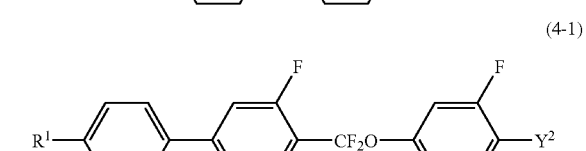
(3)

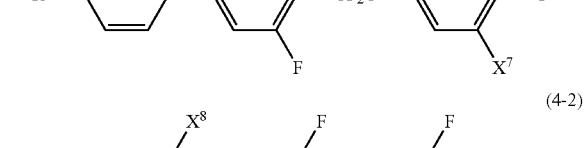
(4-1)

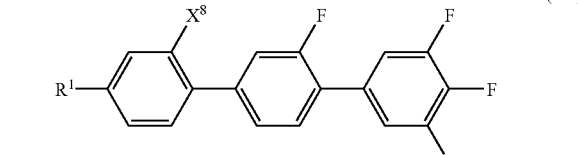
(4-2)

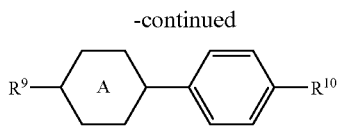

(5)

wherein $R^1$ is alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which are replaced by fluorine; $R^2$, $R^3$ and $R^5$ are each independently alkyl having 1 to 12 carbons, alkenyl having 2 to 12 carbons or alkenyl having 2 to 12 carbons, arbitrary hydrogen of which are replaced by fluorine; $R^4$ is fluorine, alkyl having 1 to 12 carbons or alkenyl having 2 to 12 carbons; $R^6$ is fluorine, chlorine, alkyl having 1 to 12 carbons, alkoxy having 1 to 12 carbons or alkenyl having 2 to 12 carbons; $R^7$ and $R^8$ are each independently alkyl having 1 to 12 carbons, alkoxy having 1 to 12 carbons, alkenyl having 2 to 12 carbons, alkadienyl having 4 to 12 carbons or alkenyl having 2 to 12 carbons, arbitrary hydrogen of which are replaced by fluorine; $R^9$ is independently alkyl having 1 to 12 carbons, alkoxy having 1 to 12 carbons, alkoxyalkyl having 2 to 12 carbons, alkenyl having 2 to 12 carbons or alkenyl having 2 to 12 carbons, arbitrary hydrogen of which are replaced by fluorine; $R^{10}$ is independently alkyl having 1 to 12 carbons, alkoxy having 1 to 12 carbons, alkoxyalkyl having 2 to 12 carbons, alkenyl having 2 to 12 carbons, alkenyl having 2 to 12 carbons, arbitrary hydrogen of which are replaced by fluorine, fluorine or chlorine; ring A is cyclohexylene or phenylene; $Y^1$ is fluorine, —$OCF_3$ or —$OCHF_2$; $Y^2$ is fluorine or —$OCF_3$; and $X^1$, $X^2$, $X^3$, $X^4$, $X^5$, $X^6$, $X^7$ and $X^8$ are each independently hydrogen or fluorine, provided that at least one of $X^4$, $X^5$ and $X^6$ is fluorine.

15. The liquid crystal composition according to claim 1, wherein the composition has a maximum temperature of a nematic phase of from approximately 70° C. to approximately 95° C., at a wavelength of 589 nm an optical anisotropy (25° C.) of from approximately 0.10 to approximately 0.16, a dielectric anisotropy (25° C., 1 kHz) of from approximately 3 to approximately 7, and a rotation viscosity (25° C.) of from approximately 30 mPa·s to approximately 100 mPa·s.

16. A liquid display device comprising the liquid crystal composition according to claim 1.

* * * * *